US012801276B2

(12) United States Patent
Ni et al.

(10) Patent No.: US 12,801,276 B2
(45) Date of Patent: Nov. 17, 2026

(54) SNAPSHOT PROCESSING METHOD AND APPARATUS

(71) Applicant: Huawei Technologies Co., Ltd., Shenzhen (CN)

(72) Inventors: Yintang Ni, Shenzhen (CN); Zeyang Shen, Wuhan (CN); Shaohua Zhao, Wuhan (CN); Zhijian Tan, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 18/709,576

(22) PCT Filed: Nov. 7, 2022

(86) PCT No.: PCT/CN2022/130265
§ 371 (c)(1),
(2) Date: May 13, 2024

(87) PCT Pub. No.: WO2023/088116
PCT Pub. Date: May 25, 2023

(65) Prior Publication Data

US 2025/0004634 A1 Jan. 2, 2025

(30) Foreign Application Priority Data

Nov. 19, 2021 (CN) ......................... 202111408548.6
Apr. 18, 2022 (CN) ......................... 202210403651.X

(51) Int. Cl.
*G06F 3/04886* (2022.01)
*G06F 1/16* (2006.01)
*G06F 16/11* (2019.01)

(52) U.S. Cl.
CPC ........ *G06F 3/04886* (2013.01); *G06F 1/1652* (2013.01); *G06F 16/128* (2019.01); *G06F 2203/04803* (2013.01)

(58) Field of Classification Search
CPC .. G06F 3/04886; G06F 16/128; G06F 1/1652; G06F 2203/04803
See application file for complete search history.

(56) References Cited

U.S. PATENT DOCUMENTS

2013/0076596 A1 3/2013 De Paz et al.
2014/0237405 A1* 8/2014 Wu .................... G06F 3/04845 715/765

(Continued)

FOREIGN PATENT DOCUMENTS

CN 103336651 A 10/2013
CN 103797460 A 5/2014

(Continued)

*Primary Examiner* — Tadesse Hailu
(74) *Attorney, Agent, or Firm* — Conley Rose, P.C.

(57) ABSTRACT

A snapshot processing method is applied to an electronic device including a foldable screen. The electronic device includes M display areas, the M display areas include N length-width ratios, and M≥N≥2. The method includes obtaining a first application switching instruction, where the first application switching instruction instructs to switch a target application from running in a background to running in a foreground; obtaining a length-width ratio of a target display area based on the first application switching instruction, where the M display areas include the target display area; obtaining a target snapshot of the target application, where a length-width ratio of the target snapshot corresponds to the length-width ratio of the target display area; and displaying the target snapshot in the target display area.

20 Claims, 22 Drawing Sheets

(56) References Cited

U.S. PATENT DOCUMENTS

| | | | | |
|---|---|---|---|---|
| 2016/0048412 | A1* | 2/2016 | Liu | G06F 9/485 718/107 |
| 2017/0123625 | A1* | 5/2017 | Gao | G06F 3/0481 |
| 2019/0205160 | A1* | 7/2019 | Chen | G06F 9/4818 |
| 2021/0089202 | A1* | 3/2021 | Sim | G09G 3/20 |
| 2021/0103420 | A1* | 4/2021 | Jung | H04N 21/44204 |
| 2021/0191741 | A1* | 6/2021 | Li | G06F 3/017 |
| 2021/0247805 | A1* | 8/2021 | Min | G06F 9/4843 |

FOREIGN PATENT DOCUMENTS

| | | | |
|---|---|---|---|
| CN | 109814793 | A | 5/2019 |
| CN | 110072012 | A | 7/2019 |
| CN | 112055244 | A | 12/2020 |
| WO | 2021089039 | A1 | 5/2021 |

* cited by examiner

SNAPSHOT PROCESSING METHOD AND APPARATUS

This application is a U.S. National Stage of International Patent Application No. PCT/CN2022/130265 filed on Nov. 7, 2022, which claims priority to Chinese Patent Application No. 202210403651.X filed on Apr. 18, 2022 and Chinese Patent Application No. 202111408548.6 filed on Nov. 19, 2021, all of which are hereby incorporated by reference in their entireties.

TECHNICAL FIELD

This application relates to the field of display technologies, and in particular, to a snapshot processing method and apparatus.

BACKGROUND

In an existing electronic device system, a task snapshot (TaskSnapshot) function is newly added. The task snapshot function means the following: When an application enters a background for running, a snapshot of the application is obtained. When the application further enters a foreground for running, the snapshot of the application is displayed as a first frame of animation of the application, so that drawing of the application is no longer relied on, thereby reducing startup time and improving user experience. The snapshot of the application may be used for display of a multi-task interface and hot start of the application.

With continuous development of foldable screen technologies, foldable screens are widely used in electronic devices. In a foldable screen scenario, a process of running a task snapshot function may be as follows: For example, when a foldable screen is in an unfolded state, an application is controlled to enter a background for running, and an application snapshot is obtained in this case, where the obtained application snapshot is shown in FIG. 1; and when the foldable screen is in a folded state, the application is controlled, by using a multi-task interface, to enter a foreground for running, and in this case, the application snapshot shown in FIG. 1 is displayed in a display area of the foldable screen in the folded state, and display effect is shown in FIG. 2. For another example, when the foldable screen is in the folded state, the application is controlled to enter the background for running, and an application snapshot is obtained in this case, where the obtained application snapshot is shown in FIG. 3; and when the foldable screen is in the unfolded state, the application is controlled, through hot start of the application, to enter the foreground for running, and in this case, the application snapshot shown in FIG. 3 is displayed in a display area of the foldable screen in the unfolded state, and display effect is shown in FIG. 4.

Because the application snapshot in FIG. 2 is truncated, and the application snapshot in FIG. 4 does not match the display area, a problem that the application snapshot cannot be correctly displayed occurs in the foldable screen scenario.

SUMMARY

This application provides a snapshot processing method and a snapshot processing apparatus, to correctly display an application snapshot, thereby avoiding a phenomenon that a snapshot is truncated or a snapshot does not match a display area.

According to a first aspect, this application provides a snapshot processing method, applied to an electronic device including a foldable screen. The electronic device includes M display areas, the M display areas include N length-width ratios, and M≥N≥2. The method includes: obtaining a first application switching instruction, where the first application switching instruction instructs to switch a target application from running in a background to running in a foreground; obtaining a length-width ratio of a target display area based on the first application switching instruction, where the M display areas include the target display area; obtaining a target snapshot of the target application, where a length-width ratio of the target snapshot corresponds to the length-width ratio of the target display area; and displaying the target snapshot in the target display area.

This embodiment of this application provides a snapshot processing method, applied to an electronic device including a foldable screen. According to the snapshot processing method, when an application is switched from running in a background to running in a foreground, a target snapshot of the application may be determined, where a length-width ratio of the target snapshot of the application matches a length-width ratio of a target display area, and the target display area is a display area that is in M display areas corresponding to the foldable screen and that is in a working state when the application is switched from running in the background to running in the foreground; and the target snapshot of the application is displayed in the target display area. Because the length-width ratio of the target snapshot of the application matches the length-width ratio of the target display area, an application snapshot is correctly displayed, thereby avoiding a phenomenon that an application snapshot is truncated or an application snapshot does not match a display area.

In a possible implementation, the method further includes: obtaining a second application switching instruction, where the second application switching instruction instructs to switch the target application from running in the foreground to running in the background; and obtaining an initial snapshot of the target application based on the second application switching instruction, where a length-width ratio of the initial snapshot corresponds to a length-width ratio of an initial display area, and the initial display area is a display area in the M display areas that is in a working state when the target application enters the background for running.

In a possible implementation, the obtaining a target snapshot of the target application includes: comparing the length-width ratio of the target display area with the length-width ratio of the initial display area; when the length-width ratio of the target display area is the same as the length-width ratio of the initial display area, determining the initial snapshot as the target snapshot; and when the length-width ratio of the target display area is different from the length-width ratio of the initial display area, changing a size of the initial snapshot based on the length-width ratio of the target display area to obtain the target snapshot.

In a possible implementation, after the obtaining an initial snapshot of the target application based on the second application switching instruction, the method further includes: separately changing a size of the initial snapshot based on (N−1) length-width ratios to obtain (N−1) candidate snapshots, where the (N−1) length-width ratios are (N−1) length-width ratios other than the length-width ratio of the initial display area in the N length-width ratios.

In a possible implementation, after the obtaining an initial snapshot of the target application based on the second application switching instruction, the method further includes: separately changing an interface size and/or an element ratio of the initial application based on (N−1)

length-width ratios to obtain (N−1) interfaces, where the (N−1) length-width ratios are (N−1) length-width ratios other than the length-width ratio of the initial display area in the N length-width ratios; and separately taking screenshots of the (N−1) interfaces to obtain (N−1) candidate snapshots.

In a possible implementation, after the obtaining an initial snapshot of the target application based on the second application switching instruction, the method further includes: receiving a foldable screen state broadcast, where the foldable screen state broadcast indicates a latest foldable screen state of the electronic device; obtaining a length-width ratio of an updated display area based on the latest foldable screen state; and changing a size of the initial snapshot based on the length-width ratio of the updated display area to obtain a candidate snapshot.

In a possible implementation, the obtaining a target snapshot of the target application includes: selecting, from the candidate snapshot, a candidate snapshot whose length-width ratio corresponds to the length-width ratio of the target display area as the target snapshot, where the candidate snapshot includes the initial snapshot and the (N−1) candidate snapshots.

In a possible implementation, the obtaining a first application switching instruction includes: obtaining the first application switching instruction based on an operation performed in a multi-task interface; or receiving a hot start operation on the application to obtain the first application switching instruction.

According to a second aspect, this application provides a snapshot processing apparatus, used in an electronic device including a foldable screen. The electronic device includes M display areas, the M display areas include N length-width ratios, and M≥N≥2. The apparatus includes: an obtaining module, configured to obtain a first application switching instruction, where the first application switching instruction instructs to switch a target application from running in a background to running in a foreground; a processing module, configured to: obtain a length-width ratio of a target display area based on the first application switching instruction, where the M display areas include the target display area; and obtain a target snapshot of the target application, where a length-width ratio of the target snapshot corresponds to the length-width ratio of the target display area; and a display module, configured to display the target snapshot in the target display area.

In a possible implementation, the obtaining module is further configured to obtain a second application switching instruction, where the second application switching instruction instructs to switch the target application from running in the foreground to running in the background; and the processing module is further configured to obtain an initial snapshot of the target application based on the second application switching instruction, where a length-width ratio of the initial snapshot corresponds to a length-width ratio of an initial display area, and the initial display area is a display area in the M display areas that is in a working state when the target application enters the background for running.

In a possible implementation, the processing module is specifically configured to: compare the length-width ratio of the target display area with the length-width ratio of the initial display area; when the length-width ratio of the target display area is the same as the length-width ratio of the initial display area, determine the initial snapshot as the target snapshot; and when the length-width ratio of the target display area is different from the length-width ratio of the initial display area, change a size of the initial snapshot based on the length-width ratio of the target display area to obtain the target snapshot.

In a possible implementation, the processing module is further configured to separately change a size of the initial snapshot based on (N−1) length-width ratios to obtain (N−1) candidate snapshots, where the (N−1) length-width ratios are (N−1) length-width ratios other than the length-width ratio of the initial display area in the N length-width ratios.

In a possible implementation, the processing module is further configured to: separately change an interface size and/or an element ratio of the initial application based on (N−1) length-width ratios to obtain (N−1) interfaces, where the (N−1) length-width ratios are (N−1) length-width ratios other than the length-width ratio of the initial display area in the N length-width ratios; and separately take screenshots of the (N−1) interfaces to obtain (N−1) candidate snapshots.

In a possible implementation, the obtaining module is further configured to receive a foldable screen state broadcast, where the foldable screen state broadcast indicates a latest foldable screen state of the electronic device; and the processing module is further configured to: obtain a length-width ratio of an updated display area based on the latest foldable screen state; and change a size of the initial snapshot based on the length-width ratio of the updated display area to obtain a candidate snapshot.

In a possible implementation, the processing module is specifically configured to select, from the candidate snapshot, a candidate snapshot whose length-width ratio corresponds to the length-width ratio of the target display area as the target snapshot, where the candidate snapshot includes the initial snapshot and the (N−1) candidate snapshots.

In a possible implementation, the obtaining module is specifically configured to: obtain the first application switching instruction based on an operation performed in a multi-task interface; or receive a hot start operation on the application to obtain the first application switching instruction.

According to a third aspect, this application provides an electronic device, including: a foldable screen, where the foldable screen includes M display areas, the M display areas include N length-width ratios, and M≥N≥2; one or more memories, configured to store one or more computer programs; and one or more processors, configured to execute the one or more computer programs, so that the electronic device performs the method according to any one of the possible implementations of the first aspect.

According to a fourth aspect, this application provides a computer-readable storage medium, including a computer program. When the computer program is executed on a computer, the computer is enabled to perform the method according to any one of the possible implementations of the first aspect.

According to a fifth aspect, this application provides a computer program. When the computer program is executed by a computer, the computer is configured to perform the method according to any one of the possible implementations of the first aspect.

According to a sixth aspect, this application provides a chip, including a processor and a memory. The memory is configured to store a computer program, and the processor is configured to invoke and run the computer program stored in the memory, to perform the method according to any one of the possible implementations of the first aspect.

BRIEF DESCRIPTION OF DRAWINGS

FIG. 8(*b*) is a snapshot 1 of a music player according to an embodiment of this application;

FIG. 8(*c*) is a snapshot 2 of a music player according to an embodiment of this application;

FIG. 8(*d*) is a schematic diagram of a common life cycle of an Activity according to an embodiment of this application:

FIG. 8(*e*) is a snapshot 3 of a music player according to an embodiment of this application:

FIG. 8(*f*) is a schematic diagram of an interface for displaying a music player in a display area A according to an embodiment of this application;

FIG. 19(*b*) is a ninth schematic diagram of a structure of a foldable screen according to this application;

DESCRIPTION OF EMBODIMENTS

The following describes the technical solutions in this application with reference to the accompanying drawings.

In the following, the terms "first" and "second" are merely used for the purpose of description, and shall not be understood as an indication or implication of relative importance or an implicit indication of a quantity of indicated technical features. Therefore, features limited by "first" and "second" may explicitly or implicitly include one or more of the features. In the descriptions of embodiments of this application, the word such as "example" or "for example" is used to represent giving an example, an illustration, or a description. Any embodiment or design solution described as an "example" or "for example" in embodiments of this application should not be explained as being more preferred or having more advantages than another embodiment or design solution. Exactly, use of the word such as "example" or "for example" is intended to present a related concept in a specific manner.

Embodiments of this application provide a snapshot processing method, applied to an electronic device including a foldable screen. According to the snapshot processing method, when an application is switched from running in a background to running in a foreground, a target snapshot of the application may be determined, where a length-width ratio of the target snapshot of the application matches a length-width ratio of a target display area, and the target display area is a display area that is in M display areas corresponding to the foldable screen and that is in a working state when the application is switched from running in the background to running in the foreground; and the target snapshot of the application is displayed in the target display area. Because the length-width ratio of the target snapshot of the application matches the length-width ratio of the target display area, an application snapshot is correctly displayed, thereby avoiding a phenomenon that an application snapshot is truncated or an application snapshot does not match a display area.

Figure 1:
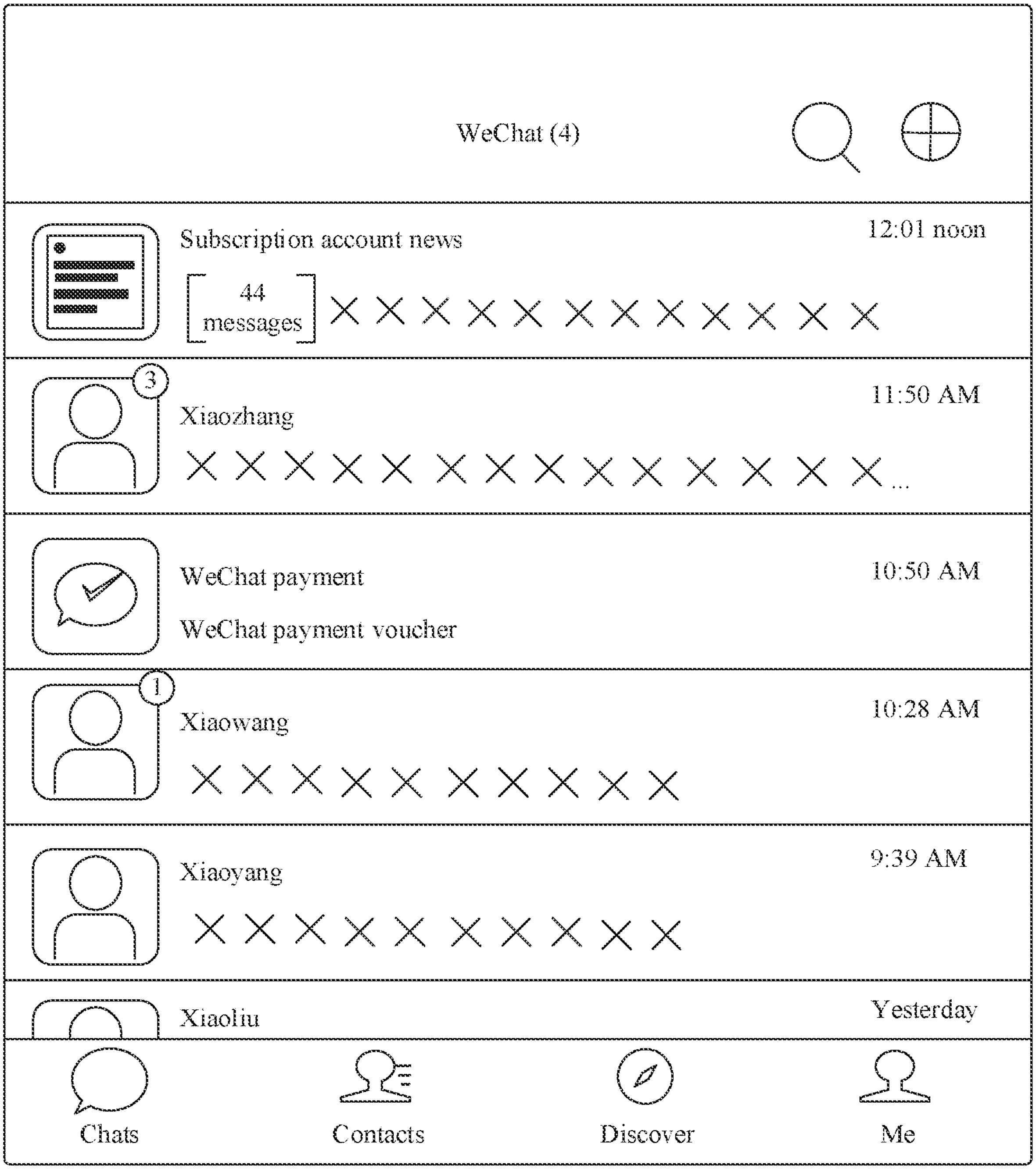
FIG. 1 is a first schematic diagram of an application snapshot.
Figure 2:
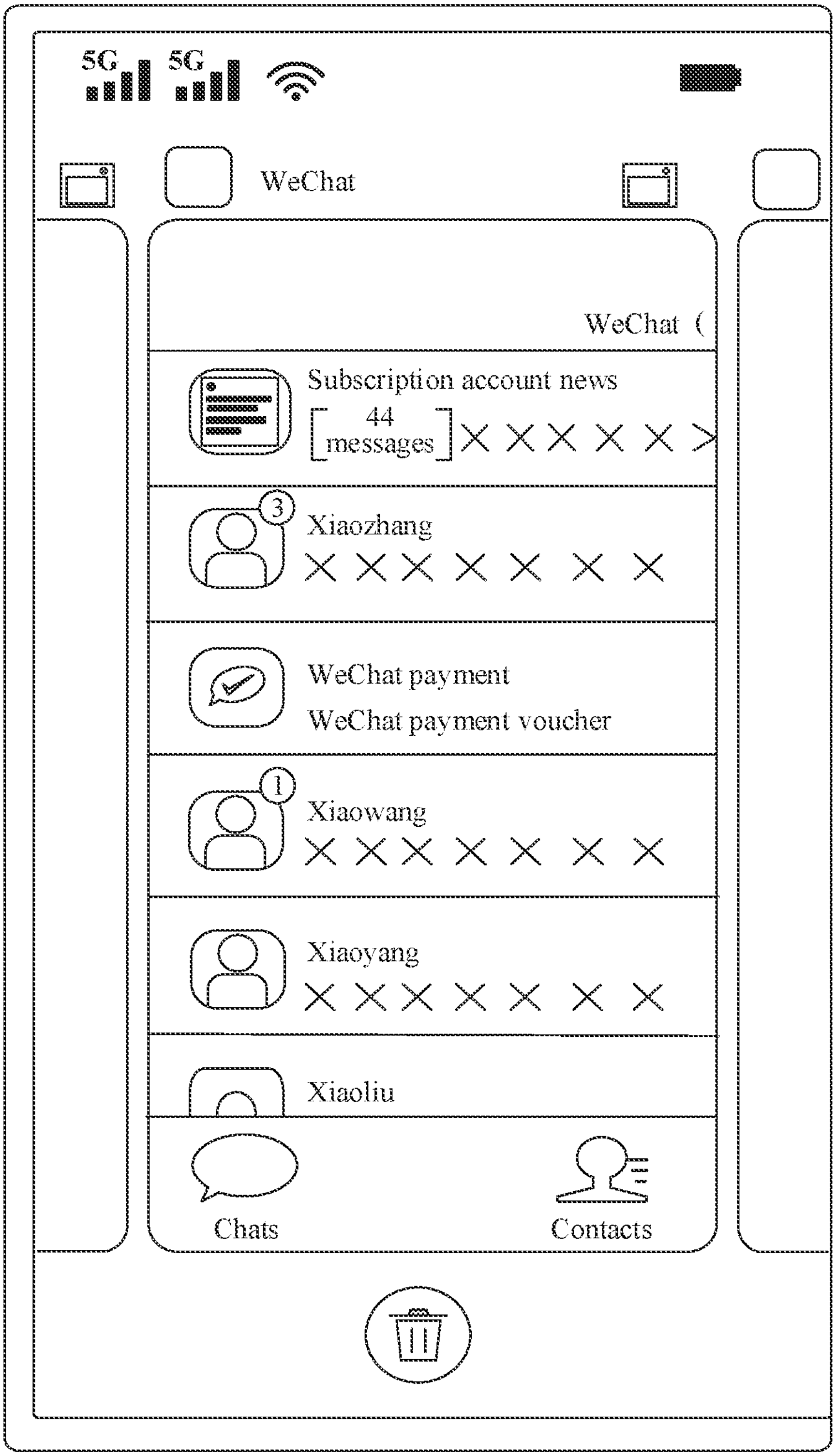
FIG. 2 is a first schematic diagram in which an application snapshot is displayed.
Figure 3:
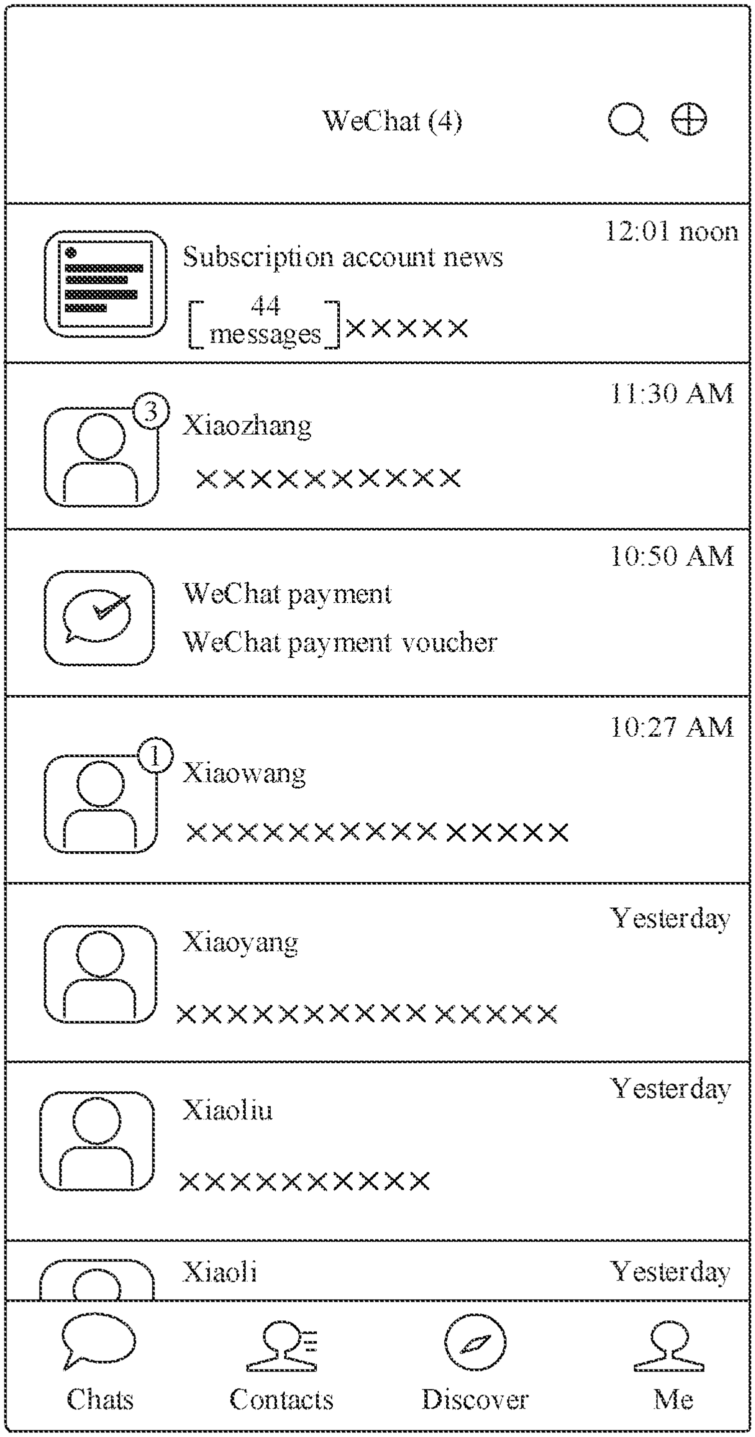
FIG. 3 is a second schematic diagram of an application snapshot.
Figure 4:
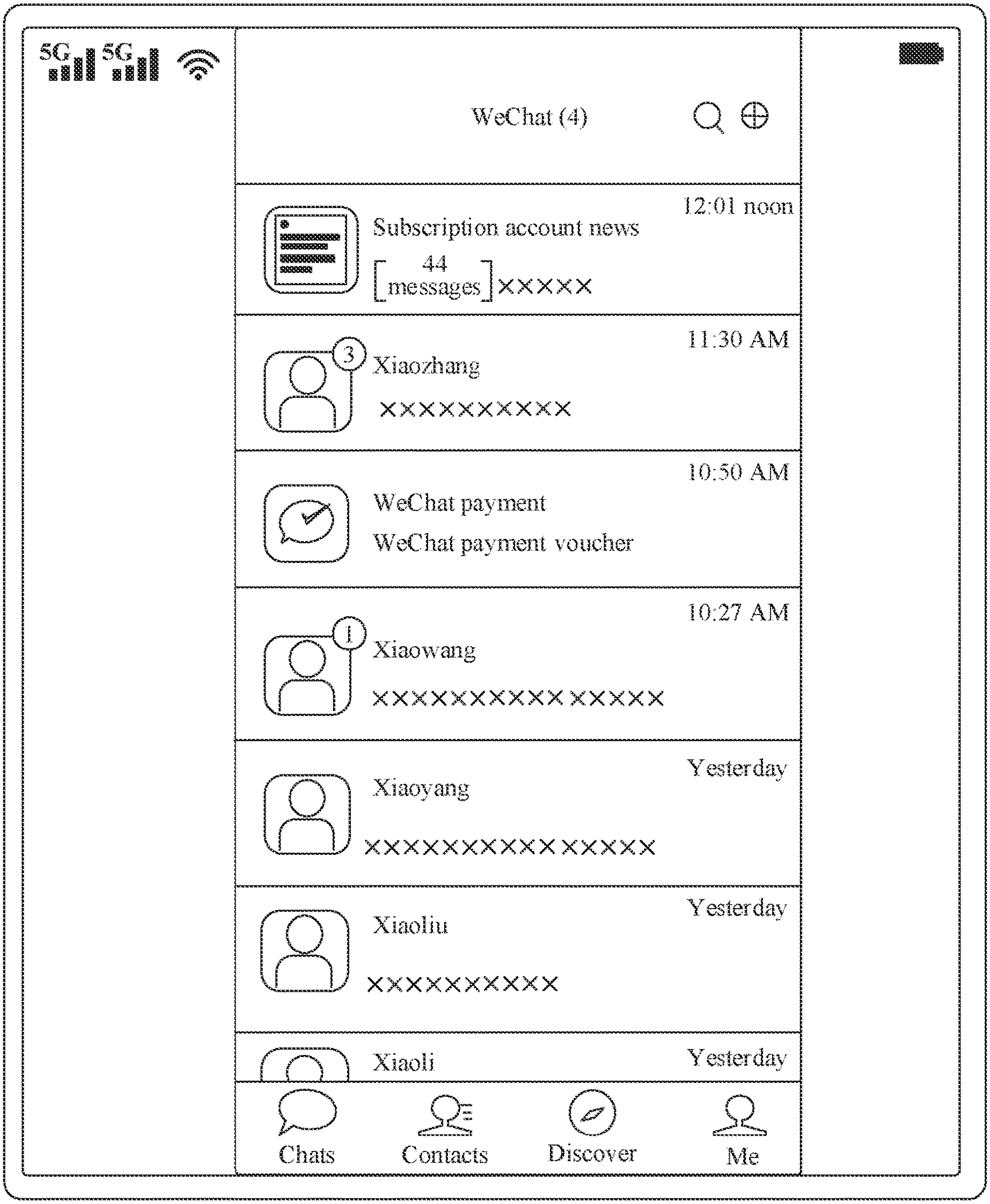
FIG. 4 is a second schematic diagram in which an application snapshot is displayed.
Figure 5:
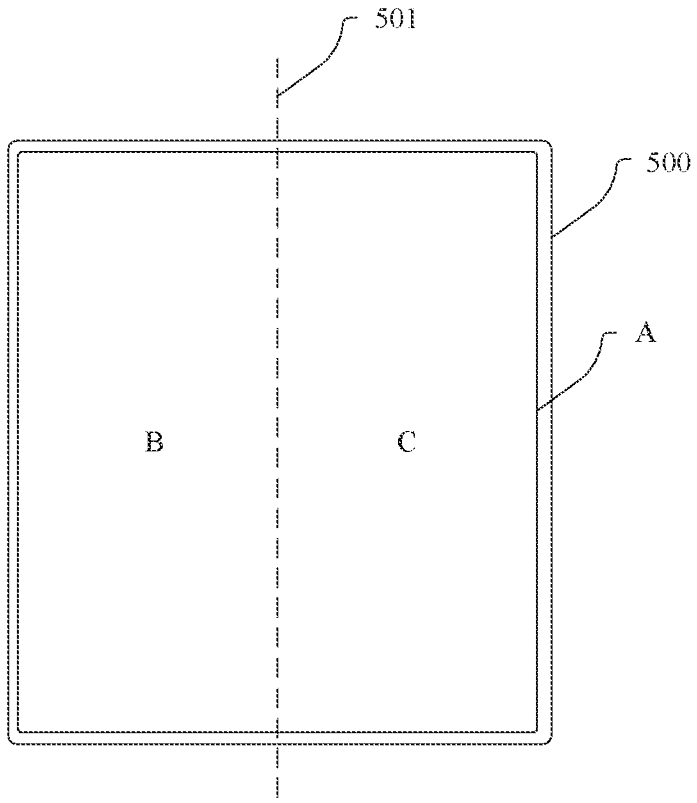
FIG. 5 is a first schematic diagram of a structure of a foldable screen according to this application.
Figure 6:
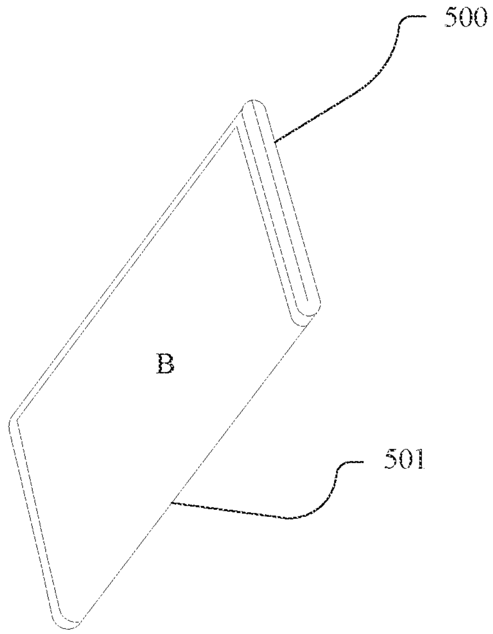
FIG. 6 is a second schematic diagram of a structure of a foldable screen according to this application.

The following describes the snapshot processing method by using an example in which an application is a music player, an electronic device is a mobile phone, and a foldable screen of the electronic device is a foldable screen shown in FIG. 5 and FIG. 6.

It can be learned from FIG. 5 and FIG. 6 that, the foldable screen 500 includes a display area A and a folding line 501. The folding line 501 divides the display area A into two display areas of a same size; a display area B and a display area C. The foldable screen 500 has a feature of being foldable, and the foldable screen 500 may be fully unfolded (as shown in FIG. 5), or the foldable screen 500 may be folded along the folding line 501 (as shown in FIG. 6), to change a state of the foldable screen 500.

In different states, the foldable screen 500 corresponds to different display areas. As shown in FIG. 5, in an unfolded state, a display area corresponding to the foldable screen 500 is the display area A. As shown in FIG. 6, in a folded state, display areas corresponding to the foldable screen 500 are the display area B and the display area C.

In the unfolded state, there is one display area corresponding to the foldable screen 500, that is, the display area A. Therefore, in the unfolded state, a display area that can be in a working state is the display area A. In the folded state, there are two display areas corresponding to the foldable screen 500, that is, the display area B and the display area C. Therefore, in the folded state, a display area that can be in a working state is the display area B or the display area C. Specifically, the display area in the working state is determined based on a display area in which a current operation of a user is performed or is determined according to a rule set by a system.

It should be noted that, in FIG. 6, because the display area C is on a back side of the display area B, the display area C cannot be seen in FIG. 6.

In conclusion, the foldable screen 500 includes a folded state and an unfolded state. In the two states, the foldable screen 500 corresponds to three display areas; the display area A, the display area B. and the display area C. Because sizes of the display area B and the display area C are the same, a quantity of types of length-width ratios of the three display areas corresponding to the foldable screen 500 is 2. A first type of length-width ratio is a length-width ratio of the display area A, and a second type of length-width ratio is length-width ratios of the display area B and the display area C.

Figure 7:
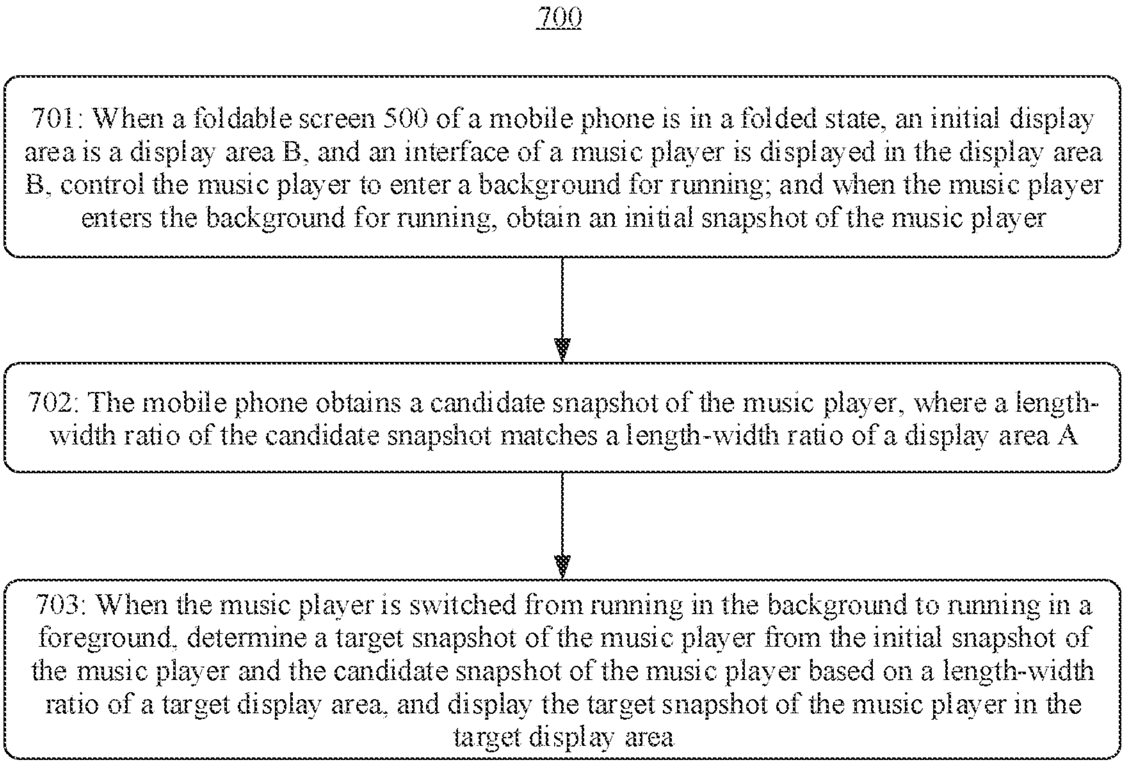
FIG. 7 is a first schematic flowchart of a snapshot processing method according to an embodiment of this application.
Figure 8A:
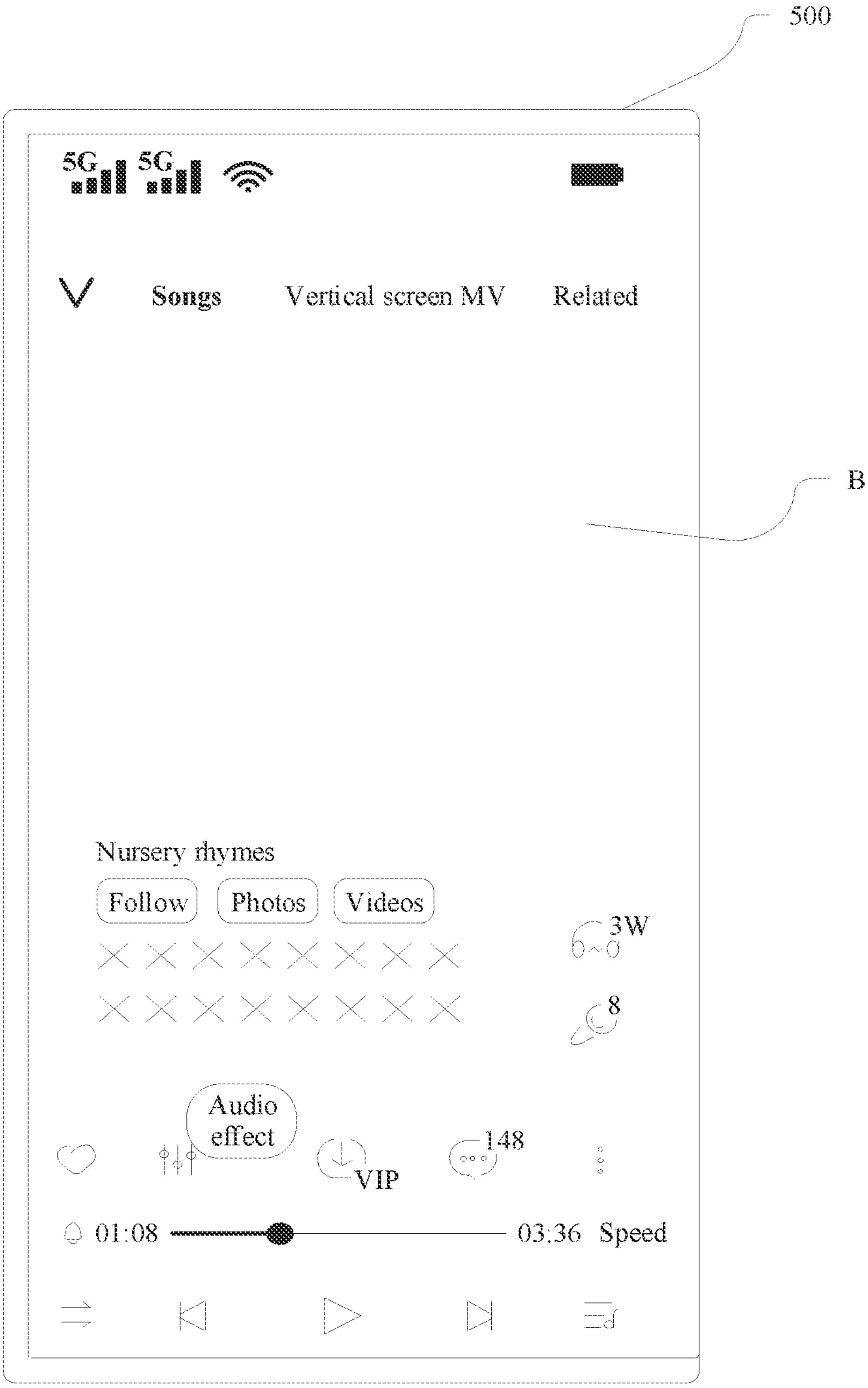
FIG. 8(*a*) is a schematic diagram of an interface for displaying a music player in a display area B according to an embodiment of this application.
Figure 8B:
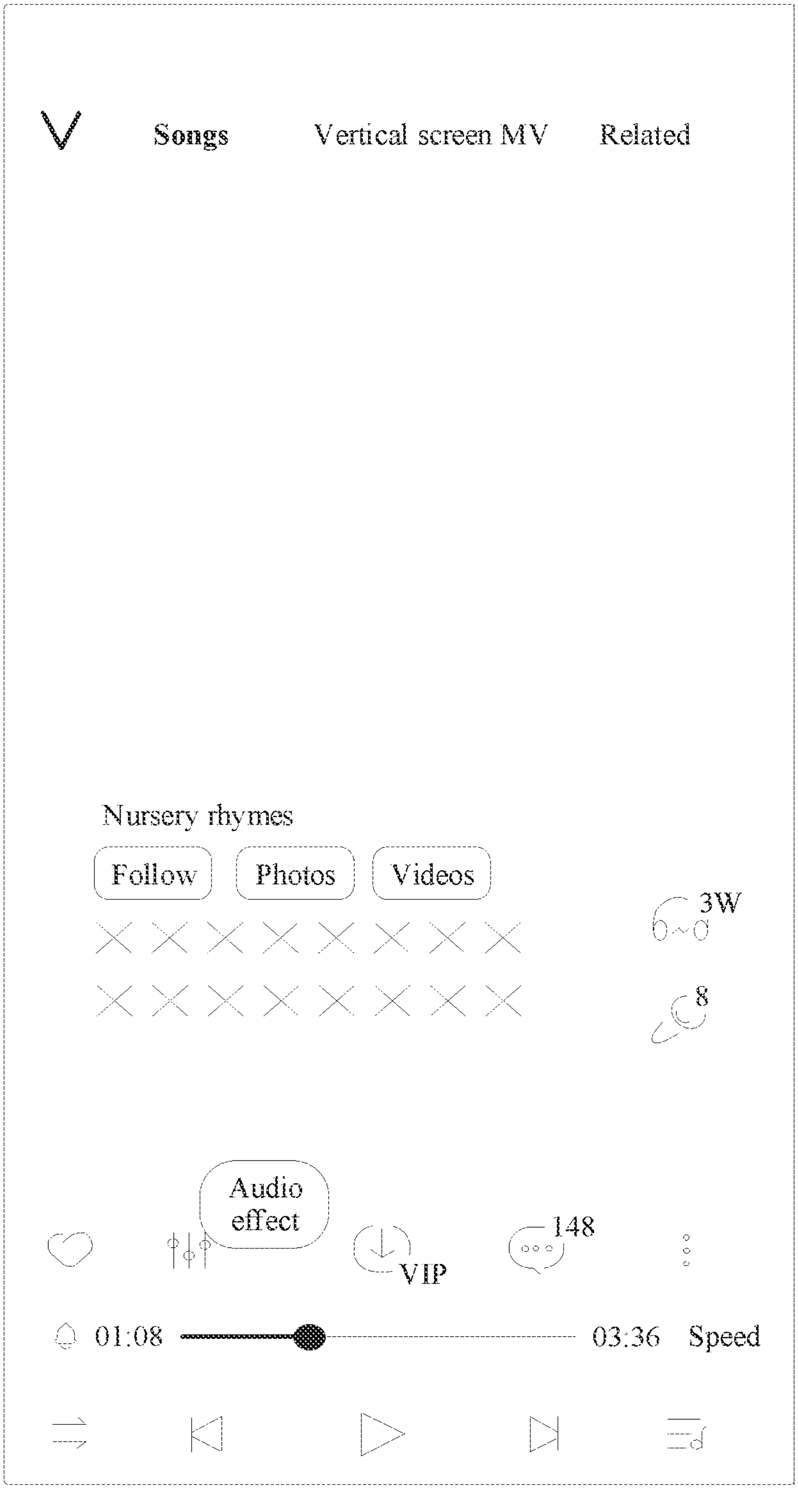
Figure 8C:
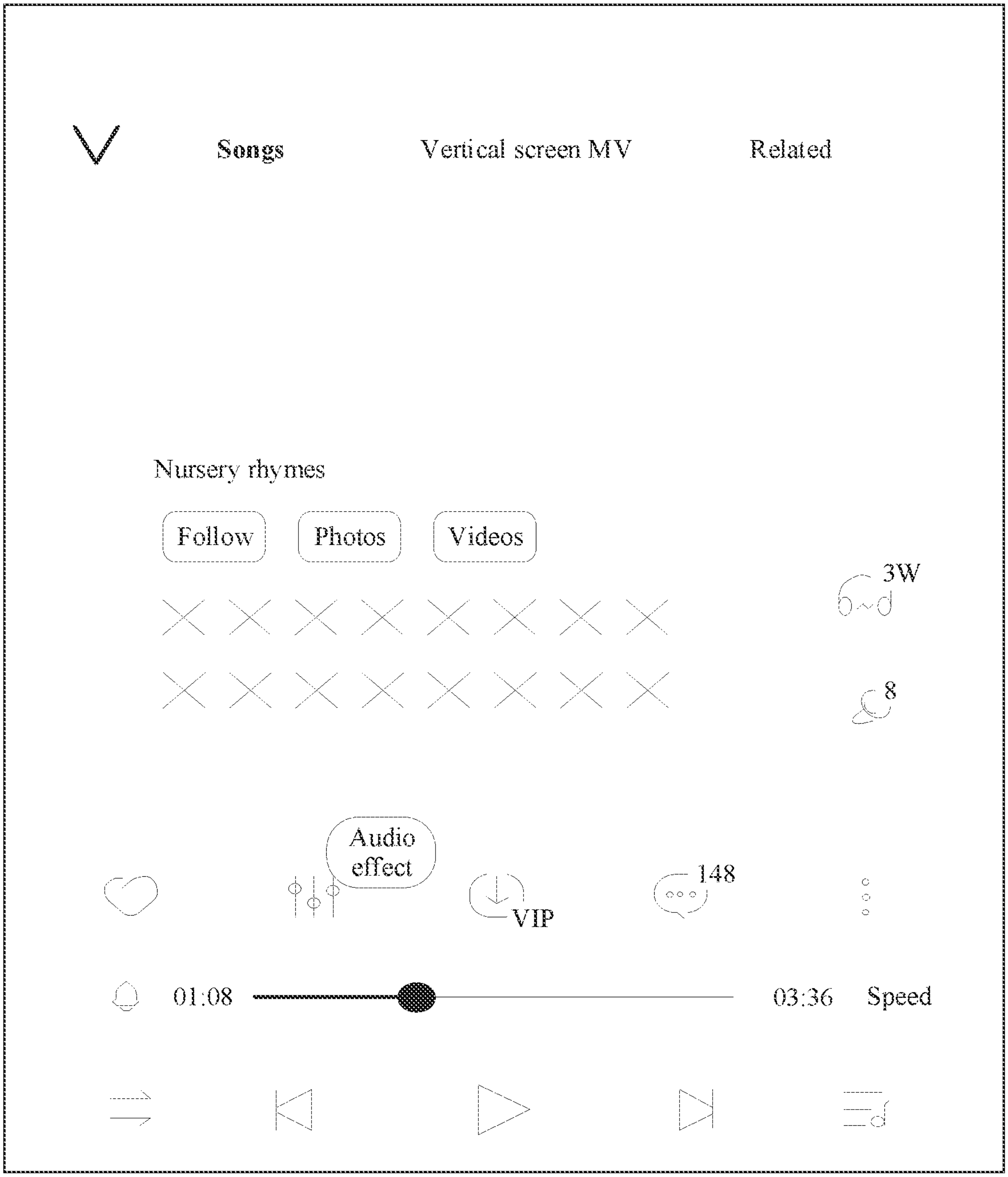
Figure 8D:
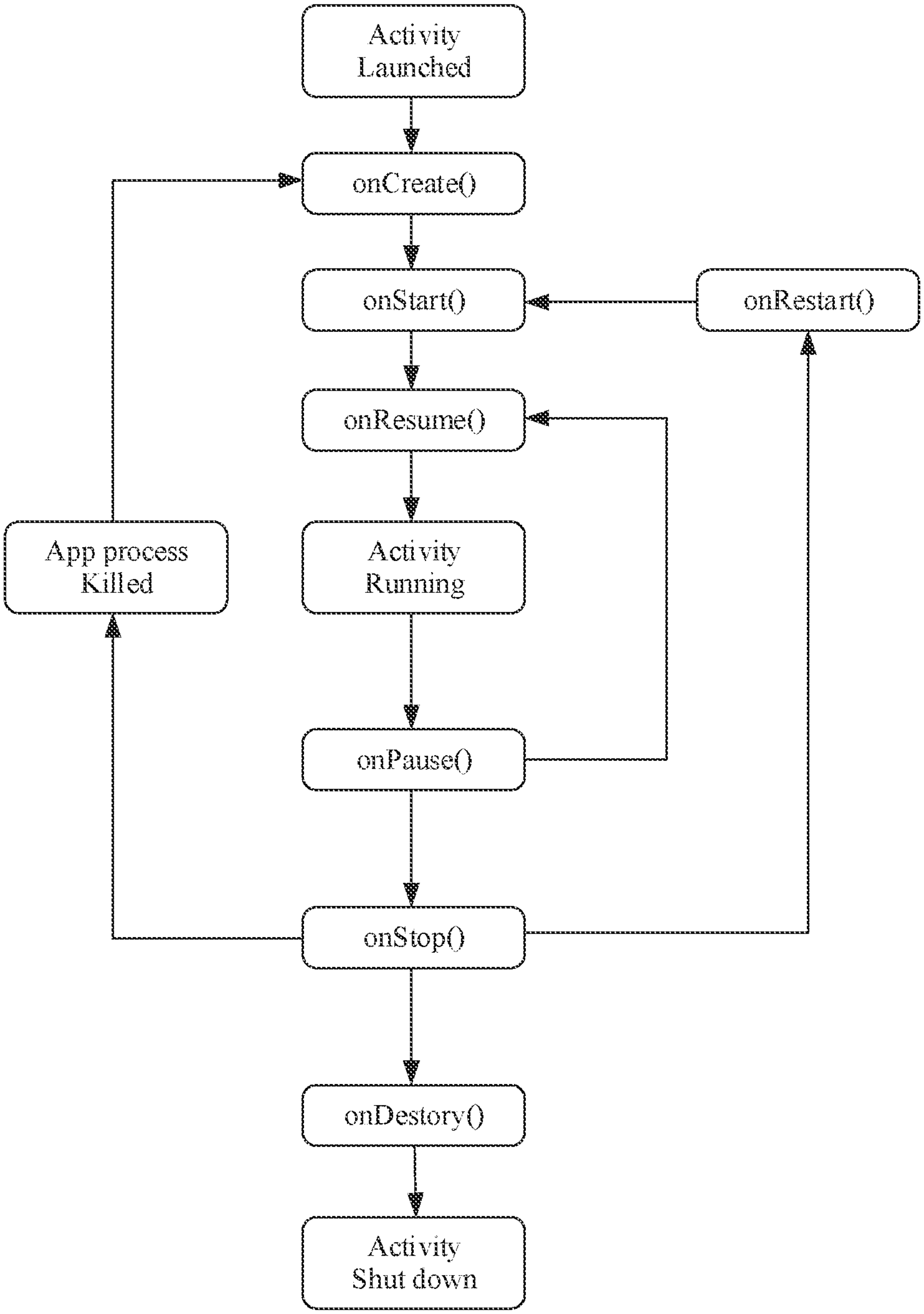
Figure 8E:
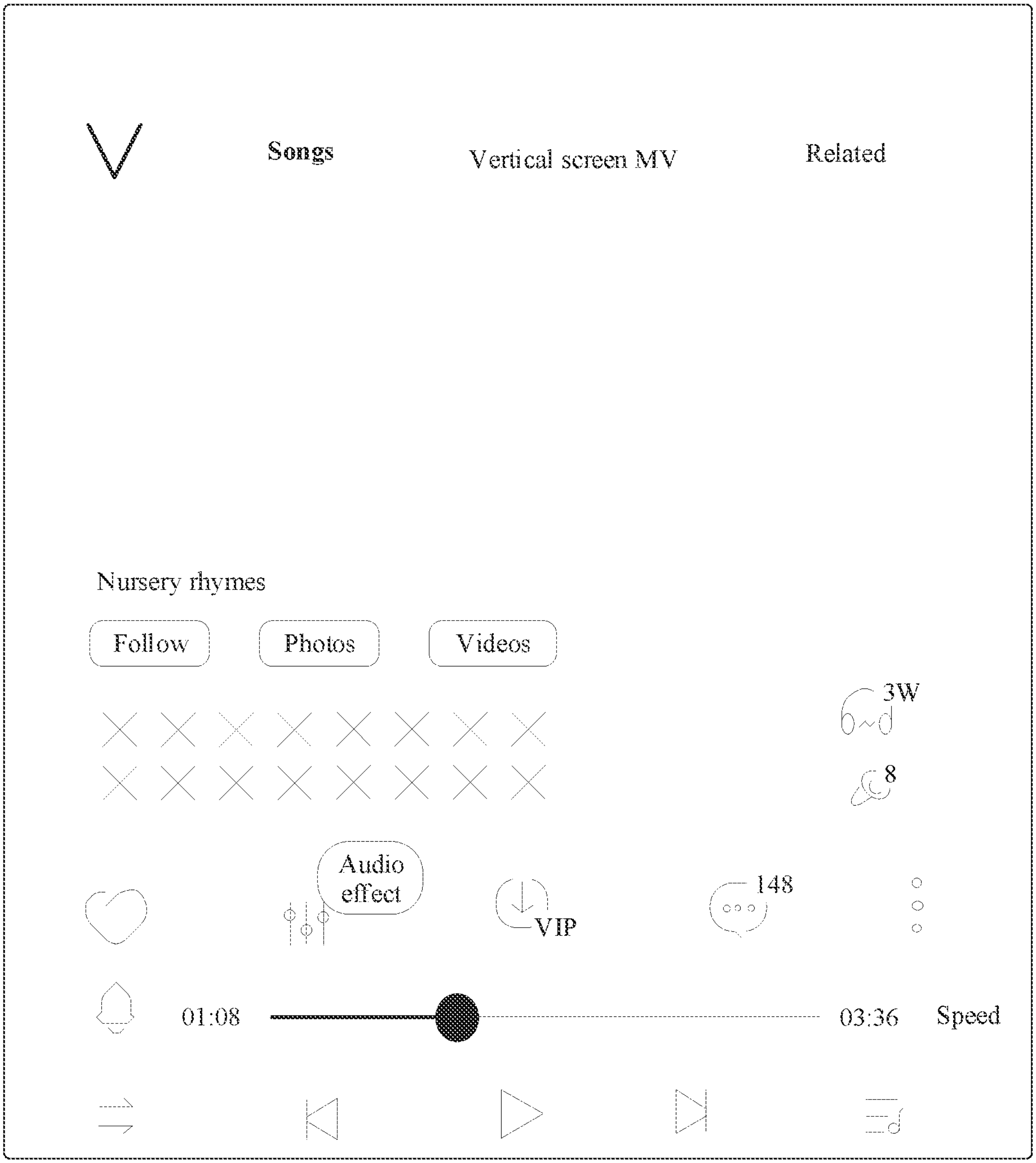
Figure 8F:
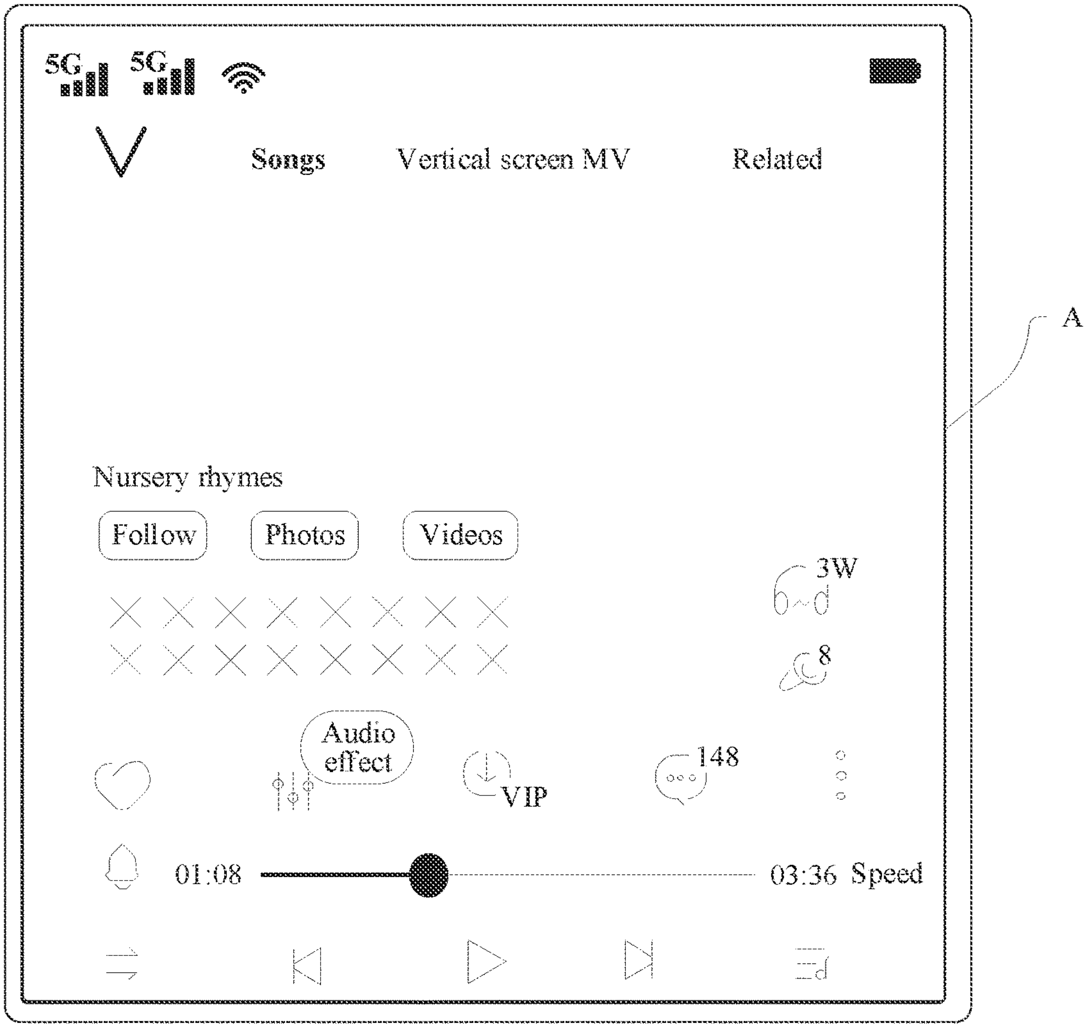

FIG. 7 is a first schematic flowchart of a snapshot processing method according to an embodiment of this application. The snapshot processing method may be represented as a process 700. The process 700 may be performed by the electronic device with a foldable screen described above. The process 700 is described as a series of steps or operations. It should be understood that, the process 700 may be performed in various sequences and/or may occur simultaneously, and is not limited to an execution sequence shown in FIG. 7. The process 700 may include the following steps.

701: When a foldable screen 500 of a mobile phone is in a folded state, an initial display area is a display area B, and an interface (as shown in FIG. 8(*a*)) of a music player is displayed in the display area B, control the music player to enter a background for running, and when the music player enters the background for running, obtain an initial snapshot of the music player.

The initial snapshot of the music player is shown in FIG. 8(*b*), and a length-width ratio of the initial snapshot of the music player matches a length-width ratio of the display area B. The initial display area is a display area that is in three display areas corresponding to the foldable screen 500 and that is in a working state when the music player enters the background for running.

A user may initiate, to the mobile phone, a request of controlling the music player to enter the background for running. The mobile phone controls, in response to the request of controlling the music player to enter the background for running, the music player to enter the background for running.

A manner of obtaining the initial snapshot of the music player may be, for example, taking a screenshot of the interface of the music player, and determining the obtained screenshot as the initial snapshot of the music player.

The user may initiate, to the mobile phone by using an operation of controlling the music player to enter the background for running, the request of controlling the music player to enter the background for running. The operation of controlling the music player to enter the background for running includes but is not limited to a sliding operation performed by the user in the display area B from bottom to top of the display area B and a voice instruction initiated by the user to control the music player to enter the background for running.

702: The mobile phone obtains a candidate snapshot of the music player, where a length-width ratio of the candidate snapshot matches a length-width ratio of a display area A.

A manner of obtaining a candidate snapshot of the music player includes but is not limited to the following four manners.

In a first manner, the initial snapshot of the music player may be compressed and/or stretched based on the length-width ratio of the display area A to obtain a candidate snapshot (as shown in FIG. 8(*c*)) of the music player, where a length-width ratio of the candidate snapshot of the music player matches (that is, is the same) the length-width ratio of the display area A.

It should be noted that a size of the candidate snapshot obtained in the first method may be the same as or different from a size of the display area A. This is not specially limited in this application.

In a second manner, the initial snapshot of the music player may be compressed and/or stretched based on a size of the display area A to obtain a candidate snapshot (as shown in FIG. 8(*c*)) of the music player, where a size of the candidate snapshot of the music player is the same as the size of the display area A Because the size of the candidate snapshot of the music player is the same as the size of the display area A, a length-width ratio of the candidate snapshot of the music player matches the length-width ratio of the display area A.

Before a third manner and a fourth manner are described, a common life cycle of an Activity is first described. FIG. 8(*d*) is a schematic diagram of a common life cycle of an Activity. As shown in FIG. 8(*d*), the common life cycle of the Activity includes the following phases:

Activity Launched: This indicates that the Activity is enabled.

onCreate( ): This is invoked when the Activity is created and is invoked only when the Activity is created for the first time, and the Activity is invisible in this case.

onStart( ): This indicates that the Activity is being enabled, and the Activity is in a visible state but cannot interact with a user.

onResume( ): This indicates that the Activity can obtain a user focus and interact with a user.

Activity Running: This indicates that the Activity is running.

onPause( ): When another Activity comes to a foreground during running, onPause( ) is executed. It should be noted that, in this phase, if a system has insufficient memory resources, the current Activity is killed, and then a current Activity is re-created from onCreate( ). If the current Activity re-obtains a user focus, the current Activity returns to onResume( ).

onStop( ): If the Activity is invisible and moves from the foreground to a background, onStop( ) is invoked. Similarly, if a system memory is insufficient, the Activity is killed (App process Killed), and then an Activity is re-created from onCreate( ).

onRestart( ): In the onStop( ) phase, if the Activity returns from the background to the foreground, onRestart( ) is executed to re-start running from onStart( ).

onDestory( ): After the Activity exits, onDestory( ) is executed to kill the Activity.

Activity Shut down: This indicates that the Activity is disabled.

In the third manner, first, after the music player enters the background for running, in the onPause( ) phase, a size of the interface of the music player and sizes and a layout of elements in the interface of the music player are adjusted based on the length-width ratio of the display area A, to obtain an adjusted interface of the music player, where a length-width ratio of the adjusted interface of the music player matches the length-width ratio of the display area A. Then, a screenshot of the adjusted interface of the music player is taken to obtain a candidate snapshot of the music player. The candidate snapshot of the music player is shown in FIG. 8(*e*), and a length-width ratio of the candidate snapshot of the music player matches the length-width ratio of the display area A.

The elements in the interface of the music player include but are not limited to: a control, a text, a picture, and the like. It should be noted that a size of the candidate snapshot of the music player may be the same as or different from a size of the display area A This is not specially limited in this application.

In the fourth manner, first, after the music player enters the background for running, in the onPause( ) phase, a size of the interface of the music player and sizes and a layout of elements in the interface of the music player are adjusted based on a size of the display area A, to obtain an adjusted interface of the music player, where a size of the adjusted interface of the music player is the same as the size of the display area A. Then, a screenshot of the adjusted interface of the music player is taken to obtain a candidate snapshot of the music player. The candidate snapshot of the music player is shown in FIG. 8(*e*). A size of the candidate snapshot of the music player is the same as the size of the display area A. Because the size of the candidate snapshot of the music player is the same as the size of the display area A, a length-width ratio of the candidate snapshot of the music player matches the length-width ratio of the display area A.

It should be noted that, in the third and fourth manners, after the candidate snapshot of the music player is obtained, the size of the interface of the music player and the sizes and the layout of the elements in the interface of the music player further need to be adjusted to restore the interface of the music player to a form before adjustment.

In the third and fourth manners, the size of the interface of the music player and the sizes and the layout of the elements in the interface of the music player are adjusted. Therefore, the candidate snapshot of the music player is not distorted, and has relatively good display effect.

703: When the music player is switched from running in the background to running in a foreground, determine a target snapshot of the music player from the initial snapshot and the candidate snapshot of the music player based on a length-width ratio of a target display area, and display the target snapshot of the music player in the target display area.

The target display area is a display area that is in the three display areas corresponding to the foldable screen and that is in a working state when the music player is switched from running in the background to running in the foreground. A length-width ratio of the target snapshot of the music player matches the length-width ratio of the target display area.

The user may initiate, to the mobile phone, a request of controlling the music player to switch from running in the background to running in the foreground. The mobile phone controls, in response to the request of controlling the music player to switch from running in the background to running in the foreground, the music player to switch from the running in background to running in the foreground, and performs step 703 when the music player is switched from the running in the background to running in the foreground.

The user may initiate, to the mobile phone, an operation of controlling the music player to switch from running in the background to running in the foreground, to initiate, to the mobile phone, the request of controlling the music player to switch from running in the background to running in the foreground.

The operation of controlling the music player to switch from running in the background to running in the foreground includes but is not limited to an operation of controlling the mobile phone to enter a multi-task interface, an operation of performing hot start on the music player, and the like. The operation of controlling the mobile phone to enter the multi-task interface includes but is not limited to: touching and holding a HOME key, initiating a voice instruction for controlling the mobile phone to enter the multi-task interface, and the like. The operation of performing hot start on the music player includes but is not limited to: tapping an icon of the music player, initiating a voice instruction for performing hot start on the music player, performing a gesture operation for performing hot start on the music player, and the like.

Between step 701 and step 703, the user may change, at least once in one of the following two manners, a display area that is in a working state in the three display areas corresponding to the foldable screen 500.

In a first manner, a state of the foldable screen 500 is changed. For example, the foldable screen 500 is changed from the folded state to an unfolded state, to change the display area in the working state from the display area B or a display area C to the display area A For another example, the foldable screen 500 is changed from the unfolded state to the folded state, to change the display area in the working state from the display area A to the display area B or the display area C.

In a second manner, when the foldable screen 500 is in the folded state, the display area in the working state is changed. For example, when the foldable screen 500 is in the folded state, the display area in the working state is changed from the display area B to the display area C. For another example, when the foldable screen 500 is in the folded state, the display area in the working state is changed from the display area C to the display area B.

Between step 701 and step 703, the user may alternatively not change a display area that is in a working state in the three display areas corresponding to the foldable screen 500.

A process of determining the target snapshot of the music player and displaying the target snapshot of the music player in the target display area may be as follows:

When the music player is switched from running in the background to running in the foreground, if the foldable screen 500 is in the unfolded state and the target display area is the display area A, a candidate snapshot that is of the music player and whose length-width ratio matches the length-width ratio of the display area A is determined as the target snapshot of the music player, and the candidate snapshot of the music player is displayed in the display area A.

On this basis, if the music player is switched, through hot start of the music player, from running in the background to running in the foreground, a manner of displaying the candidate snapshot of the music player in the display area A is, displaying the candidate snapshot of the music player in the display area A based on a launch template of the music player, where final display effect is shown in FIG. 8(*f*). It should be noted that, in FIG. 8(*f*), the candidate snapshot shown in FIG. 8(*e*) is used as an example for display.

When the music player is switched from running in the background to running in the foreground, if the foldable screen 500 is in the folded state and the target display area is the display area B, the initial snapshot that is of the music player and whose length-width ratio matches the length-width ratio of the display area B is determined as the target snapshot of the music player, and the initial snapshot of the music player is displayed in the display area B.

On this basis, if the music player is switched, through hot start of the music player, from running in the background to running in the foreground, a manner of displaying the initial snapshot of the music player in the display area B is: displaying the initial snapshot of the music player in the display area B based on the launch template of the music player, where final display effect is shown in FIG. 8(*a*).

The launch template of the music player may be a template with a size the same as that of the target display area when the music player enters the foreground for running.

It should be noted that, when the music player is switched, through hot start of the music player, from running in the background to running in the foreground, and the target snapshot of the music player is displayed in the target display area, if a size of the target snapshot of the music player is the same as the size of the target display area, the target snapshot of the music player is directly displayed in the target display area; or if the size of the target snapshot of the music player is different from the size of the target display area, the target snapshot of the music player may be increased or decreased proportionally to make the size of the target snapshot of the music player the same as the size of the target display area, and then the target snapshot that is of the music player and whose size is adjusted is displayed in the target display area.

It should be noted that, in the foregoing embodiment, if the music player is switched, by using a multi-task interface, from running in the background to running in the foreground, a manner of displaying the target snapshot of the music player in the target display area may be: displaying the target snapshot of the music player in the target display area based on a template of the multi-task interface. It should be noted that the template and a display principle of the multi-task interface are described below, and details are not described herein.

Figure 9:
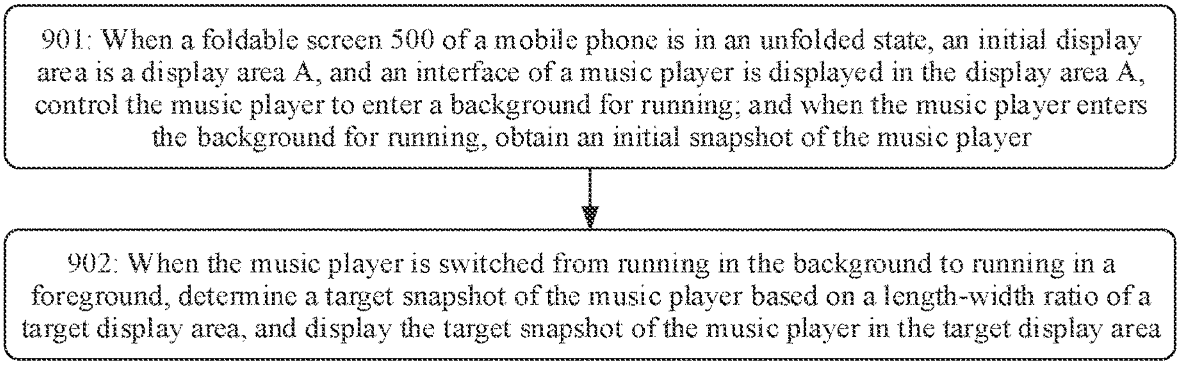
FIG. 9 is a second schematic flowchart of a snapshot processing method according to an embodiment of this application.

FIG. 9 is a second schematic flowchart of a snapshot processing method according to an embodiment of this application. The snapshot processing method includes the following steps.

901: When a foldable screen 500 of a mobile phone is in an unfolded state, an initial display area is a display area A, and an interface (as shown in FIG. 8(*f*)) of a music player is displayed in the display area A, control the music player to enter a background for running; and when the music player enters the background for running, obtain an initial snapshot of the music player.

The initial snapshot of the music player is shown in FIG. 8(*e*). A length-width ratio of the initial snapshot of the music player matches a length-width ratio of the display area A. The initial display area is a display area that is in three display areas corresponding to the foldable screen 500 and that is in a working state when the music player enters the background for running.

A user may initiate, to the mobile phone, a request of controlling the music player to enter the background for running. The mobile phone controls, in response to the request of controlling the music player to enter the background for running, the music player to enter the background for running.

A manner of obtaining the initial snapshot of the music player may be, for example, taking a screenshot of an interface of the music player, and determining the obtained screenshot of the music player as the initial snapshot of the music player.

The user may initiate, to the mobile phone by using an operation of controlling the music player to enter the background for running, the request of controlling the music player to enter the background for running. The operation of controlling the music player to enter the background for running includes but is not limited to a sliding operation performed by the user in the display area A from bottom to top of the display area A and a voice instruction initiated by the user to control the music player to enter the background for running.

902: When the music player is switched from running in the background to running in a foreground, determine a target snapshot of the music player based on a length-width ratio of a target display area, and display the target snapshot of the music player in the target display area.

A length-width ratio of the target snapshot of the music player matches the length-width ratio of the target display area. The target display area is a display area that is in the three display areas corresponding to the foldable screen 500 and that is in a working state when the music player is switched from running in the background to running in the foreground.

Because a principle of controlling the music player to switch from running in the background to running in the foreground has been described above, details are not described herein again.

Between steps 901 and 902, the user may change, at least once, a display area that is in a working state in the three display areas corresponding to the foldable screen 500; or may not change the display area that is in the working state in the three display areas corresponding to the foldable screen 500. This is not specially limited in this application. It should be noted that, a manner of changing the display area that is in the working state in the three display areas corresponding to the foldable screen 500 has been described above, and therefore details are not described herein again.

A process of determining the target snapshot of the music player and displaying the target snapshot of the music player in the target display area may be as follows:

When the music player is switched from running in the background to running in the foreground, if the foldable screen 500 is in the unfolded state and the target display area is the display area A, the initial snapshot that is of the music player and whose length-width ratio matches the length-width ratio of the display area A is determined as the target snapshot of the music player, and the initial snapshot of the music player is displayed in the display area A.

On this basis, if the music player is switched, through hot start of the music player, from running in the background to running in the foreground, a manner of displaying the initial snapshot of the music player in the display area A is: displaying the initial snapshot of the music player in the display area A based on a launch template of the music player, where final display is shown in FIG. 8(*f*).

When the music player is switched from running in the background to running in the foreground, if the foldable screen 500 is in a folded state and the target display area is the display area B, the target snapshot of the music player is obtained, where the length-width ratio of the target snapshot of the music player matches a length-width ratio of the display area B; and the target snapshot of the music player is displayed in the display area B.

A manner of obtaining a target snapshot of the music player includes but is not limited to the following four manners.

Figure 10:
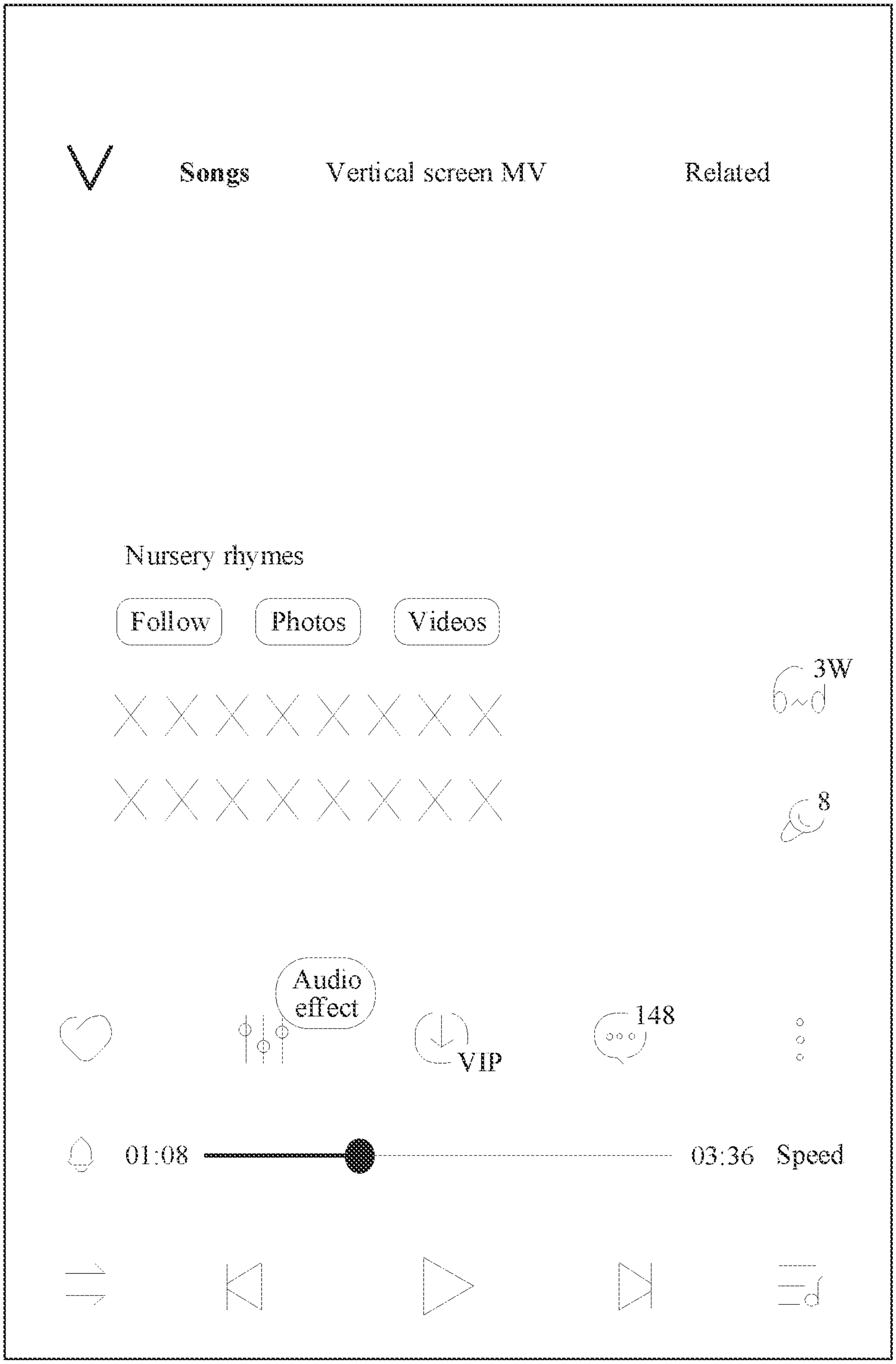
FIG. 10 is a snapshot 4 of a music player according to an embodiment of this application.

In a first manner, the initial snapshot of the music player may be compressed and/or stretched based on the length-width ratio of the display area B, to obtain a target snapshot (as shown in FIG. 10) of the music player, where a length-width ratio of the target snapshot of the music player matches (that is, is the same) the length-width ratio of the display area B.

It should be noted that a size of the target snapshot of the music player obtained in the first method may be the same as or different from a size of the display area B. This is not specially limited in this application.

In a second manner, the initial snapshot of the music player may be compressed and/or stretched based on a size of the display area B, to obtain a target snapshot (as shown in FIG. 10) of the music player, where a size of the target snapshot of the music player is the same as the size of the display area B. Because the size of the target snapshot of the music player is the same as the size of the display area B, a length-width ratio of the target snapshot of the music player matches the length-width ratio of the display area B.

In a third manner, first, an Activity is adjusted back to an onPause( ) phase by using a hook mechanism, and in the onPause( ) phase, a size of the interface of the music player and sizes and a layout of elements in the interface of the music player are adjusted based on the length-width ratio of the display area B, to obtain an adjusted interface of the music player, where a length-width ratio of the adjusted interface of the music player matches the length-width ratio of the display area B. Then, a screenshot of the adjusted interface of the music player is taken to obtain a target snapshot (as shown in FIG. 8(*b*)) of the music player, where a length-width ratio of the target snapshot of the music player matches the length-width ratio of the display area B.

The elements in the interface of the music player include but are not limited to: a control, a text, a picture, and the like. It should be noted that a size of the target snapshot of the music player may be the same as or different from a size of the display area B. This is not specially limited in this application.

In a fourth manner, first, an Activity is adjusted back to an onPause( ) phase by using a hook mechanism, and a size of the interface of the music player and sizes and a layout of elements in the interface of the music player are adjusted based on a size of the display area B, to obtain an adjusted interface of the music player, where a size of the adjusted interface of the music player is the same as the size of the display area B. Then, a screenshot of the adjusted interface of the music player is taken to obtain a target snapshot of the music player. The target snapshot of the music player is shown in FIG. 8(*b*). A size of the target snapshot of the music player is the same as the size of the display area B. Because the size of the target snapshot of the music player is the same as the size of the display area B, a length-width ratio of the target snapshot of the music player matches the length-width ratio of the display area B.

A manner of displaying the target snapshot of the music player in the display area B may be as follows:

If the music player is controlled, through hot start of the music player, to switch from running in the background to running in the foreground, a manner of displaying the target snapshot of the music player in the display area B is: displaying the target snapshot of the music player in the display area B based on the launch template of the music player, where final display is shown in FIG. 8(*a*).

It should be noted that, when the music player is controlled, through hot start of the music player, to switch from running in the background to running in the foreground, and the target snapshot of the music player is displayed in the target display area, if a size of the target snapshot of the music player is the same as a size of the target display area, the target snapshot of the music player is directly displayed in the target display area; or if the size of the target snapshot of the music player is different from the size of the target display area, the target snapshot of the music player is increased or decreased proportionally to make the size of the target snapshot of the music player the same as the size of the target display area, and then the target snapshot that is of the music player and whose size is adjusted is displayed in the target display area.

It should be noted that, in the foregoing embodiment, if the music player is switched, by using the multi-task interface, from running in the background to running in the foreground, a manner of displaying the target snapshot of the music player in the target display area may be: displaying the target snapshot of the music player in the target display area based on a template of the multi-task interface. It should be noted that the template and a display principle of the multi-task interface are described below, and details are not described herein.

Figure 11:
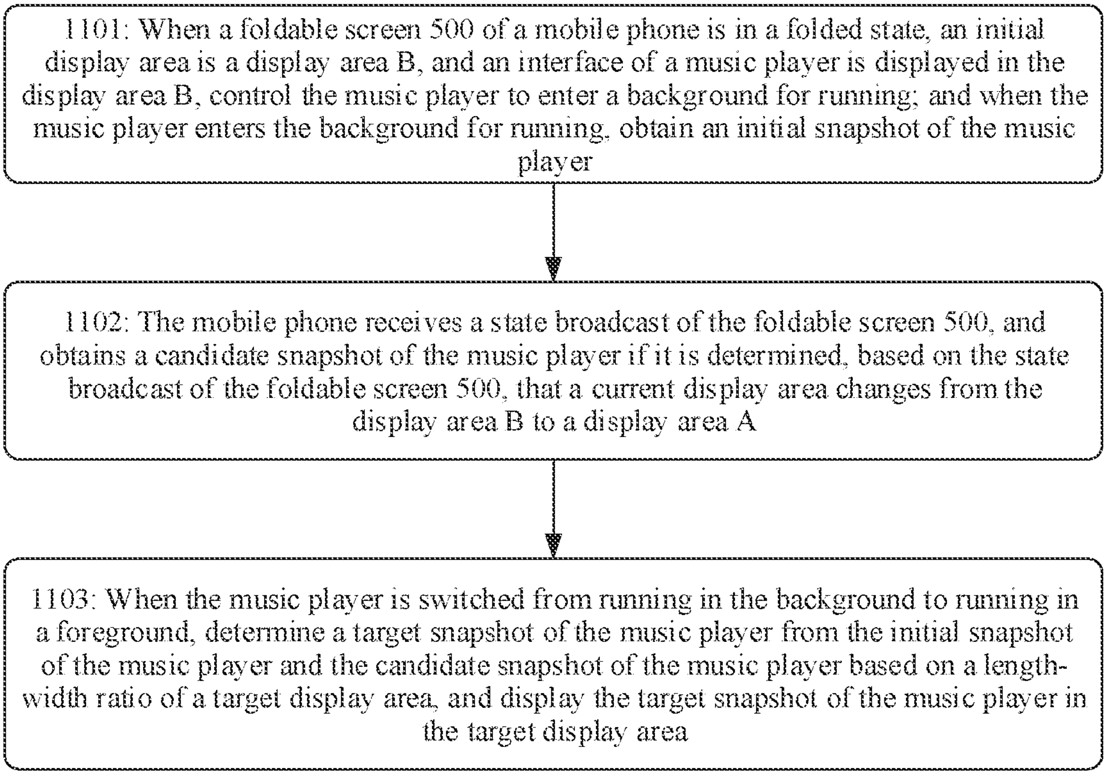
FIG. 11 is a third schematic flowchart of a snapshot processing method according to an embodiment of this application.

FIG. 11 is a third schematic flowchart of a snapshot processing method according to an embodiment of this application. The snapshot processing method includes the following steps.

1101: When a foldable screen 500 of a mobile phone is in a folded state, an initial display area is a display area B, and an interface (as shown in FIG. 8(*a*)) of a music player is displayed in the display area B, control the music player to enter a background for running; and when the music player enters the background for running, obtain an initial snapshot of the music player.

Because step 1101 has been described above, details are not described herein again.

1102: The mobile phone receives a state broadcast of the foldable screen 500, and obtains a candidate snapshot of the music player if it is determined, based on the state broadcast of the foldable screen 500, that a current display area changes from the display area B to a display area A.

A length-width ratio of the candidate snapshot of the music player matches a changed length-width ratio of the current display area. The current display area is a display area that is in a working state in three display areas corresponding to the foldable screen 500.

A manner of obtaining a candidate snapshot of the music player includes but is not limited to the following four manners.

In a first manner, the initial snapshot of the music player is compressed and/or stretched based on the changed length-width ratio of the current display area (the display area A), to obtain a candidate snapshot of the music player.

In a second manner, the initial snapshot of the music player is compressed and/or stretched based on a size of the current display area (the display area A) whose length-width ratio changes, to obtain a candidate snapshot of the music player.

In a third manner, a size of the interface of the music player and sizes and a layout of elements in the interface of the music player are adjusted based on the changed length-width ratio of the current display area, to obtain a candidate snapshot of the music player.

In a fourth manner, a size of the interface of the application and sizes and a layout of elements in the interface of the application are adjusted based on a size of the current display area whose length-width ratio changes, to obtain a candidate snapshot of the music player.

It should be noted that, in this embodiment, when the candidate snapshot of the music player is obtained in the third manner and the fourth manner, an Activity needs to be first adjusted back to an onPause( ) phase by using a hook mechanism, and then the candidate snapshot of the music player is obtained in the onPause( ) phase.

Between step 1102 and step 1103, the mobile phone may further receive the state broadcast of the foldable screen 500 at least once. Because a quantity of types of length-width ratios of the three display areas corresponding to the foldable screen 500 is 2, when receiving the state broadcast of the foldable screen 500 again, the mobile phone may not respond to the state broadcast of the foldable screen 500, to simplify a working procedure without affecting display effect.

1103: When the music player is switched from running in the background to running in a foreground, determine a target snapshot of the music player from the initial snapshot of the music player and the candidate snapshot of the music player based on a length-width ratio of a target display area, and display the target snapshot of the music player in the target display area.

A length-width ratio of the target snapshot of the music player matches the length-width ratio of the target display area. The target display area is a display area that is in a working state in the three display areas when the music player is switched from running in the background to running in the foreground.

Because a manner of controlling the music player to enter the foreground for running has been described above, details are not described herein again.

A process of determining the target snapshot of the music player and displaying the target snapshot of the music player in the target display area may be as follows:

When the music player is switched from running in the background to running in the foreground, if the foldable screen 500 is in an unfolded state and the target display area is the display area A, a candidate snapshot that is of the music player and whose length-width ratio matches a length-width ratio of the display area A is determined as the target snapshot of the music player, and the candidate snapshot of the music player is displayed in the display area A.

On this basis, if the music player is switched, through hot start of the music player, from running in the background to running in the foreground, a manner of displaying the candidate snapshot of the music player in the display area A is: displaying the candidate snapshot of the music player in the display area A based on a launch template of the music player, where final display effect is shown in FIG. 8(*f*). It should be noted that, in FIG. 8(*f*), the candidate snapshot shown in FIG. 8(*e*) is used as an example for display.

Figure 12:
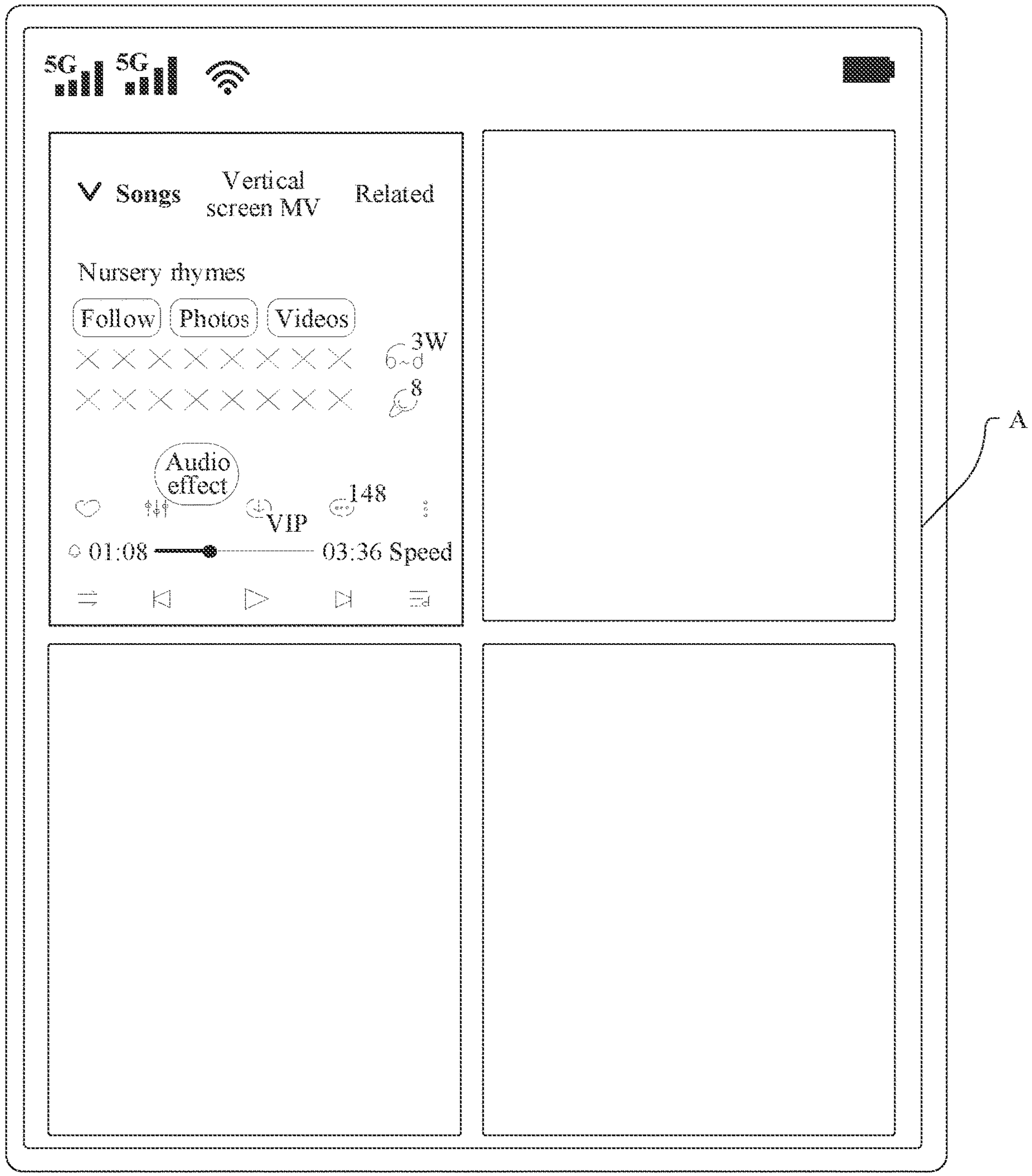
FIG. 12 is a first schematic diagram in which a snapshot is displayed by using a multi-task template according to an embodiment of this application.

If the music player is enabled, by using a multi-task interface, to enter the foreground for running, a manner of displaying the candidate snapshot of the music player in the display area A is: displaying the candidate snapshot of the music player in the display area A based on a template of the multi-task interface, where final display is shown in FIG. 12. It should be noted that, in FIG. 12, the candidate snapshot of the music player shown in FIG. 8(*e*) is used as an example for display.

The template of the multi-task interface indicates how to display, in the multi-task interface, a target snapshot of an application running in the background. The template of the multi-task interface includes at least one display block. A quantity of the at least one display block is the same as a quantity of applications running in the background. The at least one display block is in one-to-one correspondence with at least one application running in the background. The display block is used to display a target snapshot of a corresponding application running in the background. A length-width ratio of the display block matches the length-width ratio of the target display area.

In FIG. 12, because the template of the multi-task interface includes four display areas, there are four applications running in the background, and the music player is one of the four applications. Target snapshots of the other three applications are not shown in FIG. 12. It should be noted that, in FIG. 12, a principle of determining and displaying the target snapshots of the other three applications is the same as a principle of determining and displaying the target snapshot of the music player. Details are not described herein again. In addition, when there are a plurality of applications running in the background, a target snapshot of an application located at the top of a stack is first determined, and then target snapshots of applications located after the application at the top of the stack are sequentially determined.

When the music player is switched from running in the background to running in the foreground, if the foldable screen 500 is in the folded state and the target display area is the display area B, the initial snapshot that is of the music player and whose length-width ratio matches a length-width ratio of the display area B is determined as the target snapshot of the music player, and the initial snapshot of the music player is displayed in the display area B.

On this basis, if the music player is enabled, through hot start of the music player, to enter the foreground for running, a manner of displaying the initial snapshot of the music player in the display area B is: displaying the initial snapshot of the music player in the display area B based on the launch template of the music player, where final display is shown in FIG. 8(*a*).

Figure 13:
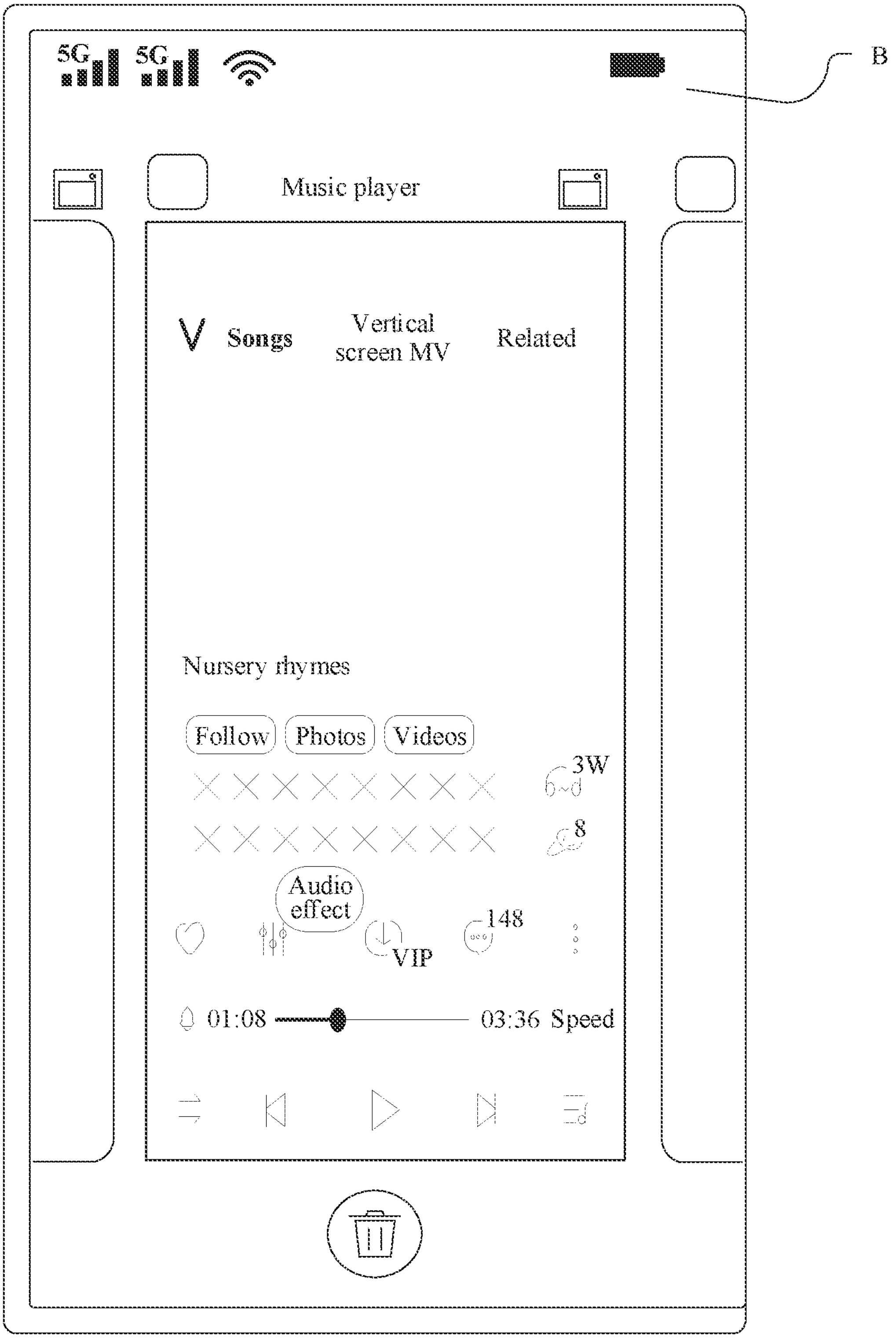
FIG. 13 is a second schematic diagram in which a snapshot is displayed by using a multi-task template according to an embodiment of this application.

If the music player is enabled, by using the multi-task interface, to enter the foreground for running, a manner of displaying the initial snapshot of the music player in the display area B is: displaying the initial snapshot of the music player in the display area B based on the template of the multi-task interface, where final display is shown in FIG. 13. It should be noted that, in FIG. 13, the initial snapshot of the music player shown in FIG. 8(*b*) is used as an example for display.

The template of the multi-task interface has been described above, and therefore details are not described herein again. In FIG. 13, the template of the multi-task interface may be slid leftwards or rightwards to view applications displayed in display blocks on two sides of the music player.

It should be noted that, when the music player is switched, through hot start of the music player, from running in the background to running in the foreground, and the target snapshot of the music player is displayed in the target display area, if a size of the target snapshot of the music player is the same as a size of the target display area, the target snapshot of the music player is directly displayed in the target display area; or if the size of the target snapshot of the music player is different from the size of the target display area, the target snapshot of the music player is increased or decreased proportionally to make the size of the target snapshot of the music player the same as the size of the target display area, and then the target snapshot that is of the music player and whose size is adjusted is displayed in the target display area.

When the music player is switched, by using the template of the multi-task interface, from running in the background to running in the foreground, and the target snapshot of the music player is displayed in a display block in the multi-task display template, if the size of the target snapshot of the music player is the same as a size of the display block, the target snapshot of the music player is directly displayed in the display block; or if the size of the target snapshot of the music player is different from the size of the display block, the target snapshot of the music player is increased or decreased proportionally to make the size of the target snapshot of the music player the same as the size of the display block, and then the target snapshot that is of the music player and whose size is adjusted is displayed in the corresponding display block.

It should be noted that, if the state broadcast of the foldable screen 500 is not received between step 1101 and step 1103, or although the state broadcast of the foldable screen 500 is received, it is determined, based on the state broadcast of the foldable screen 500, that the length-width ratio of the current display area does not change, step 1102 does not need to be performed. In addition, when step 1103 is performed, the initial snapshot of the music player is determined as the target snapshot of the music player.

In conclusion, this application provides a snapshot processing method, applied to an electronic device including a foldable screen.

The foldable screen includes at least one folding line, and the at least one folding line divides the foldable screen into a plurality of display areas. Sizes of different display areas may be completely the same, may be completely different, or may not be completely the same. This is not specially limited in this application.

The foldable screen has a feature of being foldable. A user may fully unfold the foldable screen, or may fold the foldable screen along the at least one folding line, to change a state of the foldable screen. After the state of the foldable screen changes, a display area corresponding to the foldable screen also changes. In a state, there may be one or more display areas corresponding to the foldable screen. In a state, a display area that can be in a working state is one of at least one display area corresponding to the foldable screen in the state.

Based on a plurality of states of the foldable screen, the foldable screen corresponds to M display areas, and a quantity of types of length-width ratios of the M display areas is N. M≥N≥2, and both N and M are integers.

For example, the foldable screen may be a foldable screen shown in FIG. 5 and FIG. 6. As shown in FIG. 5 and FIG. 6, the foldable screen 500 corresponds to three display areas, and a quantity of types of length-width ratios of the three display areas is 2, that is, M is 3, and N is 3.

Figure 14:
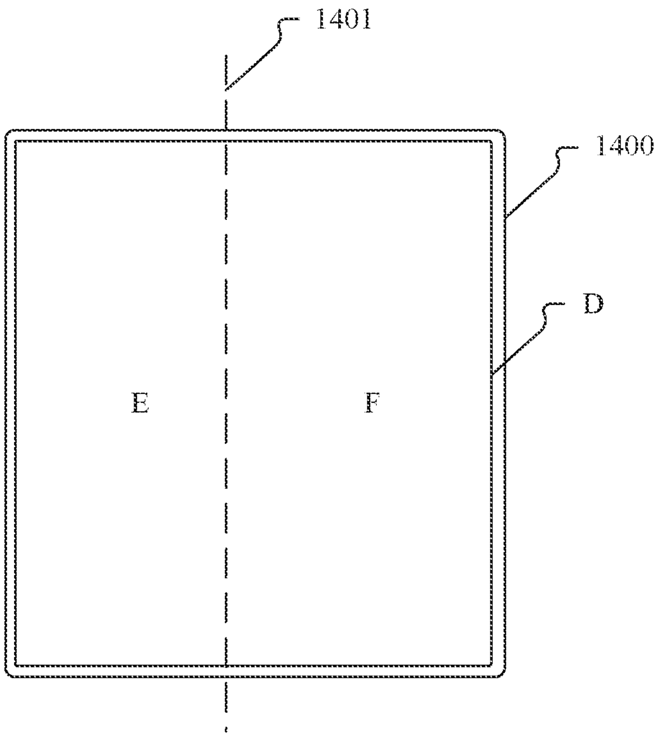
FIG. 14 is a third schematic diagram of a structure of a foldable screen according to this application.
Figure 15:
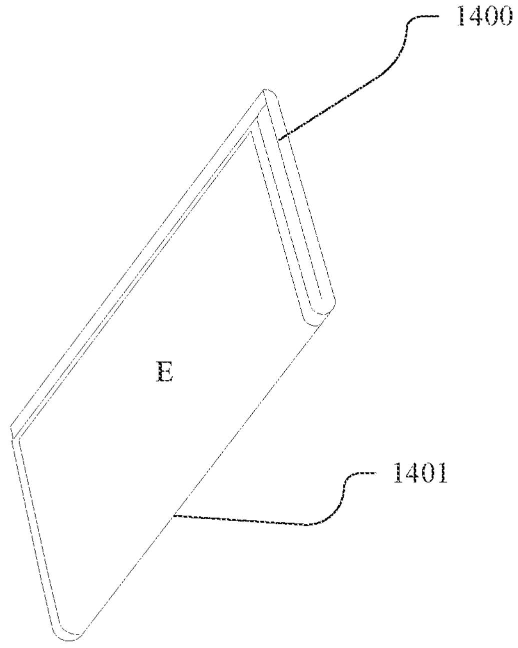
FIG. 15 is a fourth schematic diagram of a structure of a foldable screen according to this application.

For example, as shown in FIG. 14, a foldable screen 1400 includes a display area D and a folding line 1401, and the folding line 1401 divides the display area D into two display areas with different sizes: a display area E and a display area F. The foldable screen 1401 may be fully unfolded (as shown in FIG. 14), or the foldable screen 1400 may be folded along the folding line 1401 (as shown in FIG. 15), to change a state of the foldable screen 1400. It is clearly that, in different states, the foldable screen 1400 corresponds to different display areas. As shown in FIG. 14, in an unfolded state, a display area corresponding to the foldable screen 1400 is the display area D. As shown in FIG. 15, in a folded state, display areas corresponding to the foldable screen 1400 are the display area E and the display area F.

In the unfolded state, a display area that can be in a working state is the display area D. and in the folded state, a display area that can be in a working state is the display area E or the display area F. Specifically, the display area in the working state is determined based on a display area in which a current operation of a user is performed or is determined according to a rule set by a system.

It should be noted that, in FIG. 15, because the display area F is on a back side of the display area E, the display area F cannot be seen in FIG. 15.

It is clearly that, the foldable screen 1500 includes a folded state and an unfolded state. In the two states, the foldable screen 1500 corresponds to three display areas: the display area D, the display area E. and the display area F. Because sizes of the three display areas are different, a quantity of types of length-width ratios of the three display areas is 3, that is, both M and N are 3.

Figure 16:
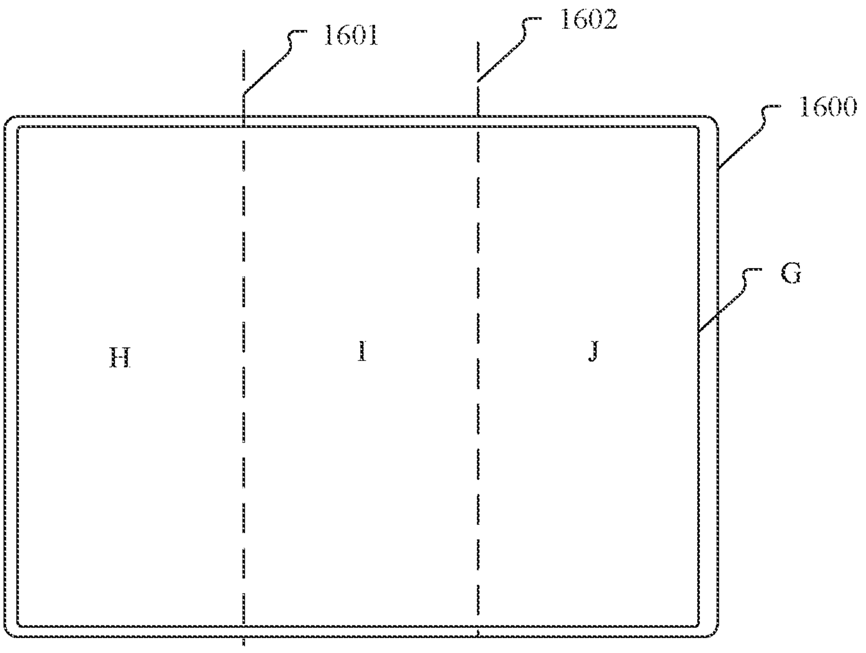
FIG. 16 is a fifth schematic diagram of a structure of a foldable screen according to this application.

For example, as shown in FIG. 16, a foldable screen 1600 includes a display area G, a folding line 1601, and a folding line 1602. The folding line 1601 and the folding line 1602 divide the display area G into three display areas with a same size: a display area H, a display area I, and a display area J.

Figure 17:
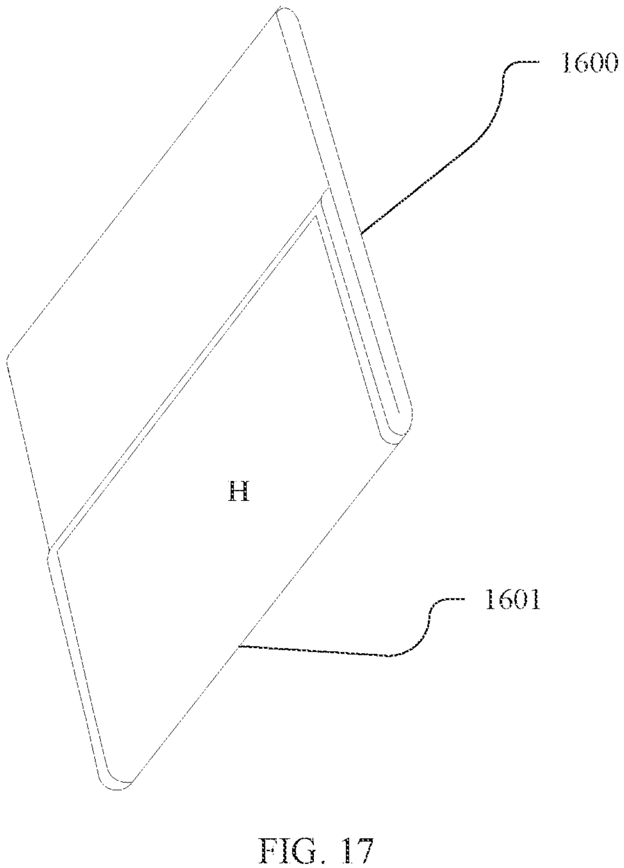
FIG. 17 is a sixth schematic diagram of a structure of a foldable screen according to this application.
Figure 18:
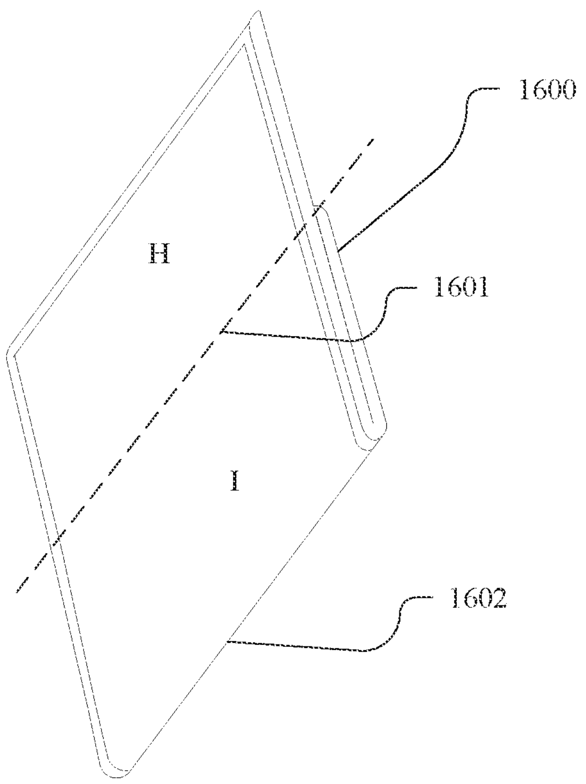
FIG. 18 is a seventh schematic diagram of a structure of a foldable screen according to this application.
Figure 19A:
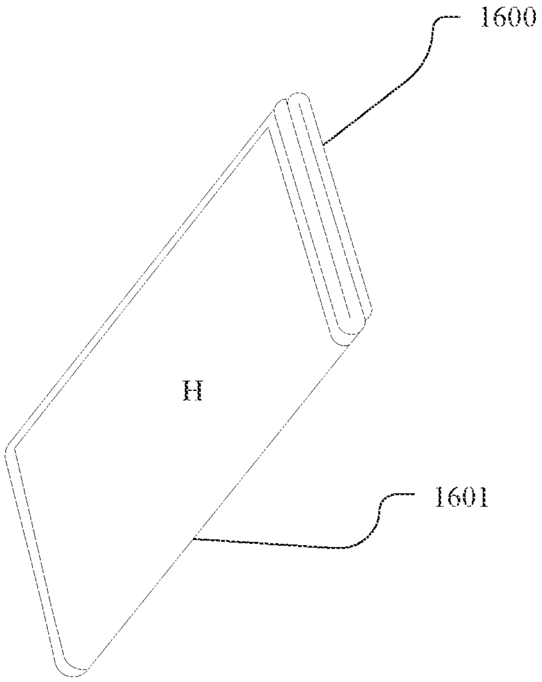
FIG. 19(*a*) is an eighth schematic diagram of a structure of a foldable screen according to this application.
Figure 19B:
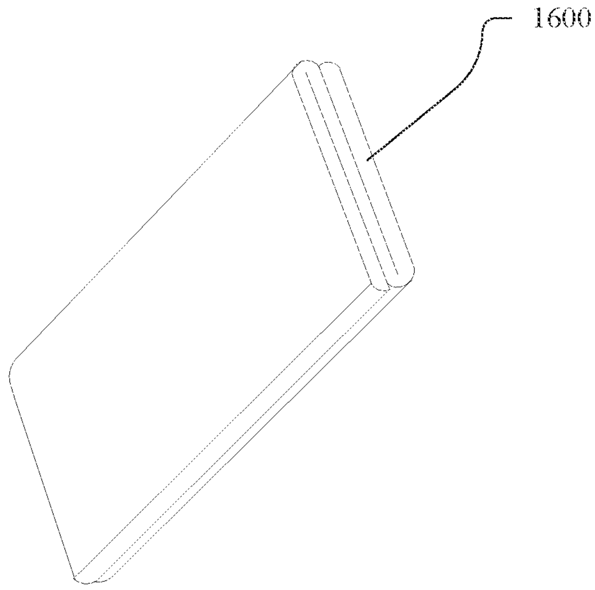
Figure 20:
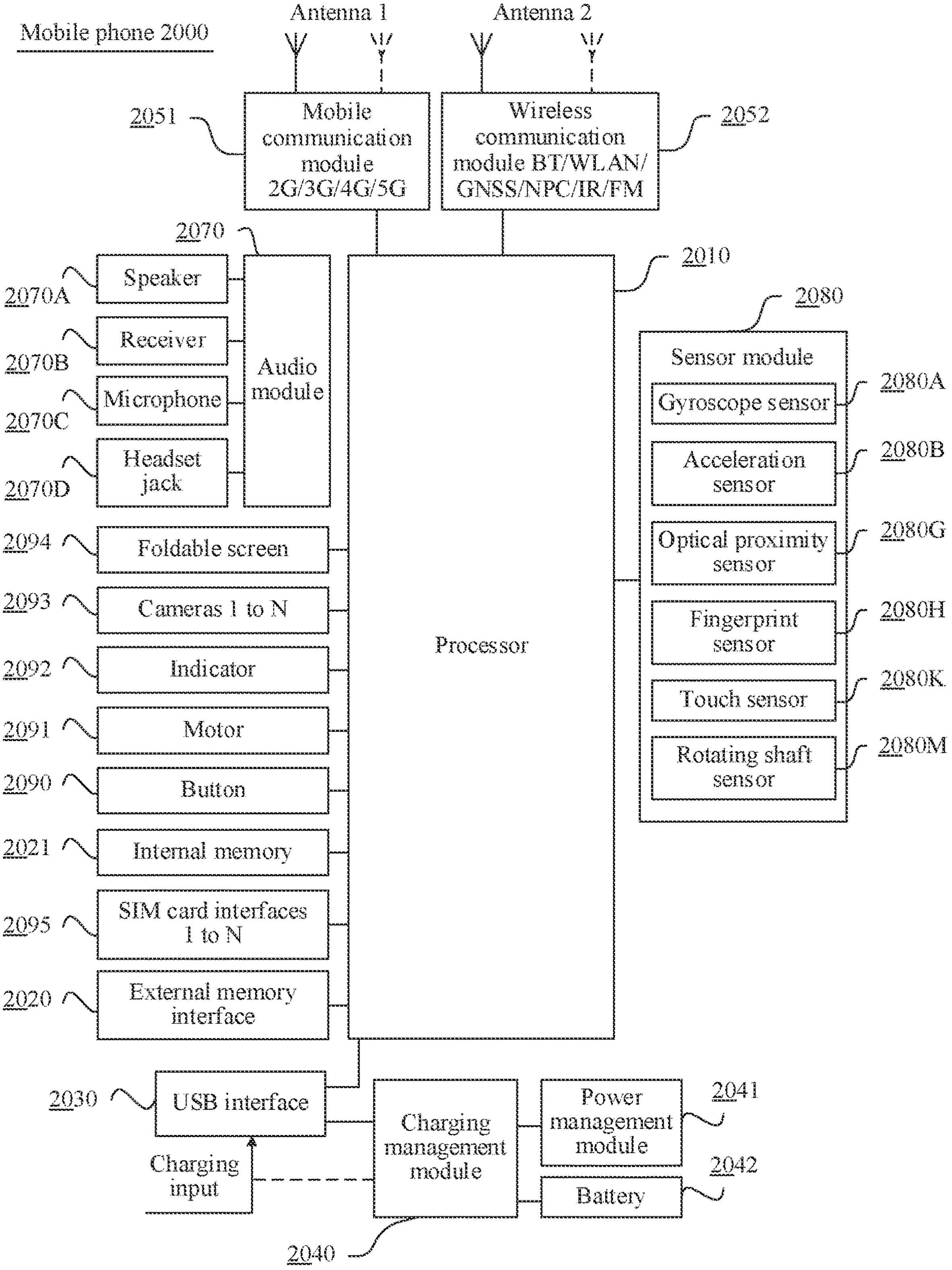
FIG. 20 is a diagram of a structure of a mobile phone according to this application.

The foldable screen 1600 may be fully unfolded (as shown in FIG. 16), the foldable screen 1600 may be folded along the folding line 1601 (as shown in FIG. 17), the foldable screen 1600 may be folded along 1602 (as shown in FIG. 18), or the foldable screen 1600 may be folded along the folding line 1601 and the folding line 1602. It should be noted that two forms may be obtained after the foldable screen 1600 is folded along the folding line 1601 and the folding line 1602. One form is shown in FIG. 19(*a*), and the other form is shown in FIG. 19(*b*).

It is clearly that, in different states, the foldable screen 1600 corresponds to different display areas. As shown in FIG. 16, in an unfolded state, a display area corresponding to the foldable screen 1600 is the display area G. In the unfolded state, a display area that can be in a working state is the display area G.

As shown in FIG. 17, in a folded state (folded along the folding line 1601), display areas corresponding to the foldable screen 1600 are the display area H and a display area K. The display area K includes the display area I and the display area J. It should be noted that, because the display area K is on a back side of the display area H, the display area K cannot be seen in FIG. 17. In the folded state, a display area that can be in a working state is the display area H or the display area K.

As shown in FIG. 18, in a folded state (folded along the folding line 1602), display areas corresponding to the foldable screen 1600 are the display area J and a display area L. The display area L includes the display area H and the display area I. It should be noted that, because the display area J is on a back side of the displayed area L, the display area J cannot be seen in FIG. 18. In the folded state, a display area that can be in a working state is the display area J or the display area L.

In a folded state (folded along the folding line 1601 and the folding line 1602), display areas corresponding to the foldable screen 1600 are the display area H (as shown in FIG. 19(*a*)) and the display area J (as shown in FIG. 19(*b*)). It should be noted that, in FIG. 19(*b*), because the display area J is on a back side, the display area J cannot be seen in FIG. 19(*b*). In the folded state, a display area that can be in a working state is the display area H or the display area J.

It is clearly that, the foldable screen 1600 includes three folded states and an unfolded state. In the four states, the foldable screen 1600 corresponds to five display areas: the display area G, the display area H, the display area K, the display area J, and the display area L. Because sizes of the display area H, the display area I, and the display area J are the same, a quantity of types of length-width ratios of the five display areas is 3, that is, M is 5, and N is 3.

It should be noted that, the foregoing description of the foldable screen is merely an example, and does not constitute a limitation on the foldable screen.

The electronic device in this application may be, for example, the mobile phone mentioned above; or may be a device including a foldable screen, such as a tablet computer, an e-reader, a personal digital assistant (personal digital assistant, PDA), or an augmented reality (augmented reality, AR)\virtual reality (virtual reality, VR) device.

An example in which the electronic device is a mobile phone is used below to describe a structure of the mobile phone.

The mobile phone 2000 may include a processor 2010, an external memory interface 2020, an internal memory 2021, a USB interface 2030, a charging management module 2040, a power management module 2041, a battery 2042, an antenna 1, an antenna 2, a mobile communication module 2051, a wireless communication module 2052, an audio module 2070, a speaker 2070A, a receiver 2070B, a microphone 2070C, a headset jack 2070D, a sensor module 2080, a button 2090, a motor 2091, an indicator 2092, a camera 2093, a foldable screen 2094, a SIM card interface 2095, and the like. The sensor module 2080 may include a gyroscope sensor 2080A, an acceleration sensor 2080B, an optical proximity sensor 2080G, a fingerprint sensor 2080H, a touch sensor 2080K, and a rotating shaft sensor 2080M (certainly, the mobile phone 2000 may further include another sensor, for example, a temperature sensor, a pressure sensor, a distance sensor, a magnetic sensor, an ambient light sensor, a barometric pressure sensor, or a bone conduction sensor, which is not shown in the figure).

It can be understood that the structure shown in this embodiment of this application does not constitute a specific limitation on the mobile phone 2000. In some other embodiments of this application, the mobile phone 2000 may include more or fewer components than those shown in the figure, or combine some components, or split some components, or have different component arrangements. The components shown in the figure may be implemented by hardware, software, or a combination of software and hardware.

The processor 2010 may include one or more processing units. For example, the processor 2010 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be independent components, or may be integrated into one or more processors. The controller may be a nerve center and a command center of the mobile phone 2000. The controller may generate an operation control signal based on instruction operation code and a timing signal, to control instruction fetching and instruction execution.

The memory may be further disposed in the processor 2010, and is configured to store instructions and data. In some embodiments, the memory in the processor 2010 is a cache. The memory may store instructions or data just used or cyclically used by the processor 2010. If the processor 2010 needs to use the instructions or the data again, the processor 2010 may directly invoke the instructions or the data from the memory. This avoids repeated access and reduces waiting time of the processor 610, thereby improving system efficiency.

The processor 2010 may run the snapshot processing method provided in this application. When different components are integrated into the processor 2010, for example, a CPU and a GPU are integrated, the CPU and the GPU may cooperate to perform the processing method provided in embodiments of this application. For example, in the processing method, some algorithms are performed by the CPU, and the other algorithms are performed by the GPU, to obtain relatively fast processing efficiency.

The foldable screen 2094 is configured to display an image, a video, and the like. The foldable screen 2094 has been described above, and details are not described herein again.

The camera 2093 (a front-facing camera, a rear-facing camera, or a camera that may serve as both a front-facing camera and a rear-facing camera) is configured to capture a static image or a video. Generally, the camera 2093 may include photosensitive elements such as a lens group and an image sensor. The lens group includes a plurality of lenses (convex lenses or concave lenses), and is configured to: collect an optical signal reflected by a to-be-photographed object, and transmit the collected optical signal to the image sensor. The image sensor generates an original image of the to-be-photographed object based on the optical signal.

The internal memory 2021 may be configured to store computer-executable program code. The executable program code includes instructions. The processor 2010 runs the instructions stored in the internal memory 2021, to perform various function applications of the mobile phone 2000 and signal processing. The internal memory 2021 may include a program storage area and a data storage area. The program storage area may store an operating system, code of an application program (for example, a Camera application or a WeChat application), and the like. The data storage area may store data (for example, a picture and a video collected by the Camera application) and the like created during use of the mobile phone 2000.

The internal memory 2021 may further store code of an anti-accidental touch algorithm. When the code of the anti-accidental touch algorithm stored in the internal memory 2021 is run by the processor 2010, a touch operation in a folding or unfolding process may be shielded.

In addition, the internal memory 2021 may include a high-speed random access memory, and may further include a non-volatile memory, for example, at least one magnetic disk storage device, a flash memory, or a universal flash storage (universal flash storage, UFS).

Certainly, code for implementing a video editing algorithm provided in this embodiment of this application may alternatively be stored in an external memory. In this case, the processor 2010 may run, by using the external memory interface 2020, the code of the algorithm stored in the external memory, to edit a video.

The following describes functions of the sensor module 2080.

The gyroscope sensor 2080A may be configured to determine a motion posture of the mobile phone 2000. In some embodiments, the gyroscope sensor 2080A may be used to determine angular velocities of the mobile phone 2000 around three axes (namely, axes x, y, and z). In other words, the gyroscope sensor 2080A may be configured to detect a current motion state of the mobile phone 2000, for example, whether the mobile phone 2000 is shaking or static.

The acceleration sensor 2080B may detect magnitudes of acceleration of the mobile phone 2000 in all directions (usually on three axes). In other words, the gyroscope sensor 2080A may be configured to detect a current motion state of the mobile phone 2000, for example, whether the mobile phone 2000 is shaking or static.

The optical proximity sensor 2080G may include, for example, a light-emitting diode (LED) and an optical detector, for example, a photodiode. The light-emitting diode may be an infrared light-emitting diode. The mobile phone emits infrared light by using the light-emitting diode. The mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone.

The gyroscope sensor 2080A (or the acceleration sensor 2080B) may send detected motion state information (such as an angular velocity) to the processor 2010. The processor 2010 determines, based on the motion state information, whether the mobile phone 2000 is in a handheld state or a tripod state (for example, when the angular velocity is not 0, it indicates that the mobile phone 2000 is in the handheld state).

The fingerprint sensor 2080H is configured to collect a fingerprint. The mobile phone 2000 may use a feature of the collected fingerprint to implement fingerprint-based unlocking, application lock access, fingerprint-based photographing, fingerprint-based call answering, and the like.

The touch sensor 2080K is also referred to as a "touch panel". The touch sensor 2080K may be disposed on the foldable screen 2094. The touch sensor 2080K and the foldable screen 2094 form a touchscreen, which is also referred to as a "touch control screen". The touch sensor 2080K is configured to detect a touch operation performed on or near the touch sensor. The touch sensor may transmit the detected touch operation to the application processor to determine a type of a touch event. A visual output related to the touch operation may be provided by using the foldable screen 2094. In some other embodiments, the touch sensor 2080K may alternatively be disposed on a surface of the mobile phone 2000 at a location different from that of the display 2094.

For example, a home screen is displayed on the foldable screen 2094 of the mobile phone 2000, and the home screen includes icons of a plurality of applications (for example, a Camera application and a WeChat application). A user taps an icon of the Camera application on the home screen by using the touch sensor 2080K, to trigger the processor 2010 to start the Camera application and turn on the camera 2093. The foldable screen 2094 displays an interface of the Camera application, for example, a framing interface.

A wireless communication function of the mobile phone 2000 may be implemented by using the antenna 1, the antenna 2, the mobile communication module 2051, the wireless communication module 2052, the modem processor, the baseband processor, and the like.

The antenna 1 and the antenna 2 are configured to transmit and receive an electromagnetic wave signal. Each antenna in the mobile phone 2000 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 2051 may provide a solution for wireless communication including 2G/3G/4G/5G and the like applied to the mobile phone 2000. The mobile communication module 2051 may include at least one filter, switch, power amplifier, and low noise amplifier (low noise amplifier, LNA), and the like. The mobile communication module 2051 may receive an electromagnetic wave through the antenna 1, perform processing such as filtering and amplification on the received electromagnetic wave, and transmit a processed electromagnetic wave to the modem processor for demodulation. The mobile communication module 2051 may further amplify a signal modulated by the modem processor, and convert the signal into an electromagnetic wave through the antenna 1 for radiation. In some embodiments, at least some functional modules of the mobile communication module 2051 may be disposed in the processor 2010. In some embodiments, at least some functional modules of the mobile communication module 2051 and at least some modules of the processor 2010 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and is then transmitted to the application processor. The application processor outputs a sound signal through an audio device (not limited to the speaker 2070A, the receiver 2070B, and the like), or displays an image or a video through the display 2094. In some embodiments, the modem processor may be an independent component. In some other embodiments, the modem processor may be independent of the processor 2010, and is disposed in a same component with the mobile communication module 2051 or another functional module.

The wireless communication module 2052 may provide a solution to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared. IR) technology, and the like applied to the mobile phone 2000. The wireless communication module 2052 may be one or more components integrating at least one communication processing module. The wireless communication module 2052 receives an electromagnetic wave through the antenna 2, performs frequency modulation and filtering processing on an electromagnetic wave signal, and sends a processed signal to the processor 2010. The wireless communication module 2052 may further receive a to-be-sent signal from the processor 2010, perform frequency modulation and amplification on the signal, and convert the signal into an electromagnetic wave through the antenna 2 for radiation.

In some embodiments, in the mobile phone 2000, the antenna 1 is coupled to the mobile communication module 2051, and the antenna 2 is coupled to the wireless communication module 2052, so that the mobile phone 62000 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

In addition, the mobile phone 2000 may implement audio functions, such as music playing and recording, by using the audio module 2070, the speaker 2070A, the receiver 2070B, the microphone 2070C, the headset jack 2070D, the application processor, and the like. The mobile phone 2000 may receive an input from the button 2090, and generate a key signal input related to user settings and function control of the mobile phone 2000. The mobile phone 2000 may generate a vibration prompt (for example, an incoming call vibration prompt) by using the motor 2091. The indicator 2092 in the mobile phone 2000 may be an indicator light, and may be configured to indicate a charging status and a power change, or may be configured to indicate a message, a missed call, a notification, and the like. The SIM card interface 2095 in the mobile phone 2000 is configured to connect to a SIM card. The SIM card may be inserted into the SIM card interface 2095 or removed from the SIM card interface 2095, to implement contact with or separation from the mobile phone 2000.

Figure 21:
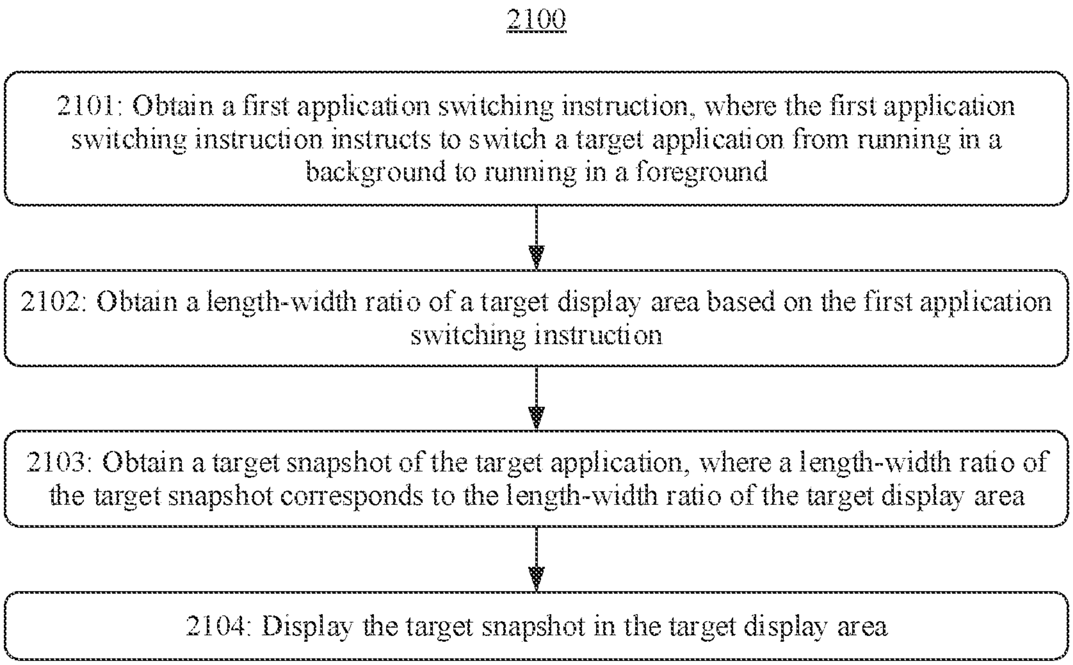
FIG. 21 is a fourth schematic flowchart of a snapshot processing method according to an embodiment of this application.

The following describes, with reference to FIG. 21, a snapshot processing method provided in this application. FIG. 21 is a fourth schematic flowchart of a snapshot processing method according to an embodiment of this application. The snapshot processing method may be represented as a process 2100. The process 2100 may be performed by the electronic device with a foldable screen described above. The process 2100 is described as a series of steps or operations. It should be understood that, the process 2100 may be performed in various sequences and/or may occur simultaneously, and is not limited to an execution sequence shown in FIG. 21. The process 2100 may include the following steps.

Step 2101: Obtain a first application switching instruction, where the first application switching instruction instructs to switch a target application from running in a background to running in a foreground.

In a possible implementation, the electronic device may further obtain a second application switching instruction, where the second application switching instruction instructs to switch the target application from running in the foreground to running in the background; and then obtain an initial snapshot of the target application based on the second application switching instruction, where a length-width ratio of the initial snapshot corresponds to a length-width ratio of an initial display area, and the initial display area is a display area in M display areas that is in a working state when the target application enters the background for running.

When an application enters the background for running, an initial snapshot of the application is obtained.

The application may be, for example, the music player mentioned in the foregoing embodiments, or may be an application of a communication type, a video type, a shopping type, a reading type, or another type. This is not specially limited in this application.

A user may initiate, to the electronic device, a request of controlling the application to enter the background for running. The electronic device controls, in response to the request of controlling the application to enter the background for running, the application to enter the background for running; and obtains the initial snapshot of the application when the application enters the background for running.

A manner of obtaining the initial snapshot of the application may be: taking a screenshot of a corresponding interface, and determining the screenshot as the initial snapshot of the application.

A display area that is in the M display areas corresponding to the foldable screen and that is in a working state when the application enters the background for running is used as the initial display area.

The length-width ratio of the initial display area matches a length-width ratio of the initial snapshot.

Step 2102: Obtain a length-width ratio of a target display area based on the first application switching instruction.

The target display area is a display area that is in the M display areas corresponding to the foldable screen and that is in a working state when the application is switched from running in the background to running in the foreground. A length-width ratio of a target snapshot of the application matches the length-width ratio of the target display area.

The length-width ratio of the target display area may be the same as or different from the length-width ratio of the initial display area. This is not specially limited in this application. The target display area and the initial display area may be a same display area, or may be different display areas. This is not specially limited in this application.

Before the application is switched from running in the background to running in the foreground, a display area that is in a working state in the M display areas corresponding to the foldable screen may be changed at least once, or the display area that is in the working state in the M display areas corresponding to the foldable screen may not be changed.

A manner of changing the display area that is in the working state in the M display areas corresponding to the foldable screen includes but is not limited to the following two manners.

In a first manner, a state of the foldable screen is changed to change the display area that is in the working state in the M display areas corresponding to the foldable screen. For example, the foldable screen is changed from a folded state to an unfolded state, or the foldable screen is changed from an unfolded state to a folded state.

In a second manner, in a folded state that includes a plurality of display areas, a display area in a working state is switched between the plurality of display areas corresponding to the foldable screen.

The user may initiate, to the electronic device, a request of controlling the application to switch from running in the background to running in the foreground. The electronic device controls, in response to the request of controlling the application to switch from running in the background to running in the foreground, the application to enter the foreground for running; and when the application enters the foreground for running, determines the target snapshot of the application, and displays the target snapshot of the application in the target display area.

For a manner in which the user initiates the request of controlling the application to enter the foreground for running, refer to the foregoing description of initiating the request of controlling the music player to enter the foreground for running.

It should be noted that the foregoing method may be applied to different processing scenarios, and in different processing scenarios, manners of determining the target snapshot of the application are different.

Step 2103: Obtain a target snapshot of the target application, where a length-width ratio of the target snapshot corresponds to the length-width ratio of the target display area.

The following describes three processing scenarios and manners of determining the target snapshot of the application in the three processing scenarios. It should be noted that, the three processing scenarios described herein are merely examples, and are not intended to limit this application.

A first processing scenario is as follows: First, before the target snapshot of the application is determined. (N−1) candidate snapshots of the application may be first obtained. Length-width ratios of the (N−1) candidate snapshots are in one-to-one correspondence with (N−1) length-width ratios. The (N−1) length-width ratios are length-width ratios other than the length-width ratio of the initial display area in N length-width ratios corresponding to the M display areas. In this way, the (N−1) candidate snapshots of the application and the initial snapshot of the application can cover the N length-width ratios. Then, the target snapshot of the application is determined from the (N−1) candidate snapshots of the application and the initial snapshot of the application based on the length-width ratio of the target display area.

A manner of obtaining the (N−1) candidate snapshots of the application includes but is not limited to the following four manners.

In a first manner, the initial snapshot of the application is compressed and/or stretched based on each of the (N−1) length-width ratios to obtain the (N−1) candidate snapshots of the application.

In a second manner, the initial snapshot of the application is compressed and/or stretched based on a size of a display area corresponding to each of the (N−1) length-width ratios to obtain the (N−1) candidate snapshots of the application.

In a third manner, a size of the interface of the application and sizes and a layout of elements in the interface of the application are adjusted based on each of the (N−1) length-width ratios, to obtain the (N−1) candidate snapshots of the application.

In a fourth manner, a size of the interface of the application and sizes and a layout of elements in the interface of the application are adjusted based on a size of a display area corresponding to each of the (N−1) length-width ratios, to obtain the (N−1) candidate snapshots of the application.

For example, a manner of determining the target snapshot of the application may be:

- determining, from the initial snapshot of the application and the (N−1) candidate snapshots of the application, a snapshot that matches the length-width ratio of the target display area as the target snapshot.

A second processing scenario is as follows: When the target snapshot of the application is determined, if the length-width ratio of the target display area is the same as the length-width ratio of the initial display area, the initial snapshot of the application is determined as the target snapshot of the application; or if the length-width ratio of the target display area is different from the length-width ratio of the initial display area, the target snapshot of the application is obtained, where the length-width ratio of the target snapshot of the application matches the length-width ratio of the target display area.

In the second processing scenario, it is determined, based on a result of matching between the length-width ratio of the target display area and the length-width ratio of the initial display area, to continue to use the initial snapshot of the application or generate the target snapshot of the application, thereby reducing a quantity of generated snapshots and reducing a computation amount.

A manner of obtaining the target snapshot of the application includes but is not limited to the following four manners.

In a first manner, the initial snapshot of the application is compressed and/or stretched based on the length-width ratio of the target display area, to obtain the target snapshot of the application.

In a second manner, the initial snapshot is compressed and/or stretched based on a size of the target display area to obtain the target snapshot of the application.

In a third manner, a size of the interface of the application and sizes and a layout of elements in the interface of the application are adjusted based on the length-width ratio of the target display area, to obtain the target snapshot of the application.

In a fourth manner, a size of the interface of the application and sizes and a layout of elements in the interface of the application are adjusted based on a size of the target display area, to obtain the target snapshot of the application.

A third processing scenario is as follows: First, before the application enters the foreground for running, if a state broadcast of the foldable screen is received at least once, each time the state broadcast of the foldable screen is received, it is determined, based on the state broadcast of the foldable screen, whether a length-width ratio of a current display area changes, and a candidate snapshot of the application is obtained after it is determined that the length-width ratio of the current display area changes. The current display area is a display area that is in a working state in the M display areas corresponding to the foldable screen, and a length-width ratio of the candidate snapshot matches a changed length-width ratio of the current display area. Then, the target snapshot of the application is determined from the initial snapshot of the application and the candidate snapshot of the application based on the length-width ratio of the target display area.

It should be noted that, to reduce a workload and avoid repeated generation of candidate snapshots with a same length-width ratio, in another embodiment, after it is determined that the length-width ratio of the current display area changes, if a candidate snapshot whose length-width ratio matches the changed length-width ratio of the current display area already exists, it is unnecessary to generate a candidate snapshot whose length-width ratio matches the changed length-width ratio of the current display area.

It should be noted that, before the application enters the foreground for running, if the electronic device does not receive the state broadcast of the foldable screen, or although the electronic device receives the state broadcast of the foldable screen, it is determined, based on the state broadcast of the foldable screen, that the length-width ratio of the current display area does not change, there is no need to obtain a candidate snapshot of the application.

A manner of obtaining a candidate snapshot of the application includes but is not limited to the following four manners.

In a first manner, the initial snapshot of the application is compressed and/or stretched based on the changed length-width ratio of the current display area, to generate a candidate snapshot of the application.

In a second manner, the initial snapshot of the application is compressed and/or stretched based on a size of the current display area whose length-width ratio changes, to generate a candidate snapshot of the application.

In a third manner, a size of the interface of the application and sizes and a layout of elements in the interface of the application are adjusted based on the changed length-width ratio of the current display area, to obtain a candidate snapshot of the application.

In a fourth manner, a size of the interface of the application and sizes and a layout of elements in the interface of the application are adjusted based on a size of the current display area whose length-width ratio changes, to obtain a candidate snapshot of the application.

For example, a manner of determining the target snapshot of the application is shown below.

Before the application enters the foreground for running, if the state broadcast of the foldable screen is received at least once, a snapshot that matches the length-width ratio of the target display area is determined from the initial snapshot of the application and the candidate snapshot of the application as the target snapshot of the application.

Before the application enters the foreground for running, if the state broadcast of the foldable screen is not received, or the state broadcast of the application is received but the length-width ratio of the current display area does not change, that is, it indicates that the length-width ratio of the initial display area is the same as the length-width ratio of the target display area, the initial display area of the application is determined as the target snapshot of the application.

Step 2104: Display the target snapshot in the target display area.

A manner of displaying the target snapshot of the application in the target display area includes the following two manners.

In a first manner, if the application is enabled, by using a multi-task interface, to enter the foreground for running, the target snapshot of the application is displayed in the target display area based on a template of the multi-task interface. For details about the template of the multi-task interface and a principle of displaying the target snapshot of the application in the target display area by using the template of the multi-task interface, refer to the foregoing description.

In a second manner, if the application is enabled, through hot start of the application, to enter the foreground for running, the target snapshot of the application is displayed in the target display area based on a launch template of the application. For details about the launch template of the application and a principle of displaying the target snapshot of the application in the target display area by using the launch template of the application, refer to the foregoing description.

In conclusion, when the application enters the foreground for running, the length-width ratio of the target snapshot matches the length-width ratio of the target display area. Therefore, when the target snapshot is displayed in the target display area, correctness of snapshot display can be determined, thereby avoiding a phenomenon that a snapshot is truncated or a snapshot does not match a display area.

Embodiments of this application provide a snapshot processing method, applied to an electronic device including a foldable screen. According to the snapshot processing method, when an application is switched from running in a background to running in a foreground, a target snapshot of the application may be determined, where a length-width ratio of the target snapshot of the application matches a length-width ratio of a target display area, and the target display area is a display area that is in M display areas corresponding to the foldable screen and that is in a working state when the application is switched from running in the background to running in the foreground; and the target snapshot of the application is displayed in the target display area. Because the length-width ratio of the target snapshot of the application matches the length-width ratio of the target display area, an application snapshot is correctly displayed, thereby avoiding a phenomenon that an application snapshot is truncated or an application snapshot does not match a display area.

Figure 22:
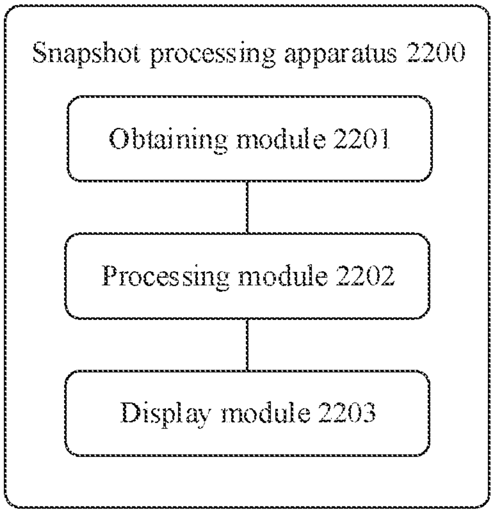
FIG. 22 is a schematic diagram of a structure of a snapshot processing apparatus according to an embodiment of this application.

This application further provides a snapshot processing apparatus, used in an electronic device including a foldable screen. The electronic device includes M display areas, the M display areas include N length-width ratios, and M≥N≥2. As shown in FIG. 22, the snapshot processing apparatus 2200 includes an obtaining module 2201, a processing module 2202, and a display module 2203.

The obtaining module 2201 is configured to obtain a first application switching instruction, where the first application switching instruction instructs to switch a target application from running in a background to running in a foreground. The processing module 2202 is configured to: obtain a length-width ratio of a target display area based on the first application switching instruction, where the M display areas include the target display area; and obtain a target snapshot of the target application, where a length-width ratio of the target snapshot corresponds to the length-width ratio of the target display area. The display module 2203 is configured to display the target snapshot in the target display area.

In a possible implementation, the obtaining module 2201 is further configured to obtain a second application switching instruction, where the second application switching instruction instructs to switch the target application from running in the foreground to running in the background; and the processing module 2202 is further configured to obtain an initial snapshot of the target application based on the second application switching instruction, where a length-width ratio of the initial snapshot corresponds to a length-width ratio of an initial display area, and the initial display area is a display area in the M display areas that is in a working state when the target application enters the background for running.

In a possible implementation, the processing module 2202 is specifically configured to: compare the length-width ratio of the target display area with the length-width ratio of the initial display area; when the length-width ratio of the target display area is the same as the length-width ratio of the initial display area, determine the initial snapshot as the target snapshot; and when the length-width ratio of the target display area is different from the length-width ratio of the initial display area, change a size of the initial snapshot based on the length-width ratio of the target display area to obtain the target snapshot.

In a possible implementation, the processing module 2202 is further configured to separately change a size of the initial snapshot based on (N−1) length-width ratios to obtain (N−1) candidate snapshots, where the (N−1) length-width ratios are (N−1) length-width ratios other than the length-width ratio of the initial display area in the N length-width ratios.

In a possible implementation, the processing module 2202 is further configured to: separately change an interface size and/or an element ratio of the initial application based on (N−1) length-width ratios to obtain (N−1) interfaces, where the (N−1) length-width ratios are (N−1) length-width ratios other than the length-width ratio of the initial display area in the N length-width ratios; and separately take screenshots of the (N−1) interfaces to obtain (N−1) candidate snapshots.

In a possible implementation, the obtaining module 2201 is further configured to receive a foldable screen state broadcast, where the foldable screen state broadcast indicates a latest foldable screen state of the electronic device; and the processing module 2202 is further configured to: obtain a length-width ratio of an updated display area based on the latest foldable screen state; and change a size of the initial snapshot based on the length-width ratio of the updated display area to obtain a candidate snapshot.

In a possible implementation, the processing module 2202 is specifically configured to select, from the candidate snapshot, a candidate snapshot whose length-width ratio corresponds to the length-width ratio of the target display area as the target snapshot, where the candidate snapshot includes the initial snapshot and the (N−1) candidate snapshots.

In a possible implementation, the obtaining module 2201 is specifically configured to: obtain the first application switching instruction based on an operation performed in a multi-task interface; or receive a hot start operation on the application to obtain the first application switching instruction.

For an implementation principle and technical effects of the snapshot processing apparatus 2200 provided in this application, refer to the descriptions of the foregoing method embodiments. Details are not described herein again.

This application further provides an electronic device. The electronic device includes: a foldable screen, where the foldable screen includes M display areas, the M display areas include N length-width ratios, and M≥N≥2; one or more memories, configured to store one or more computer programs; and one or more processors, configured to execute the one or more computer programs, so that the electronic device performs the snapshot processing method described above.

This application further provides a computer-readable storage medium, including a computer program. When the computer program is executed on a computer, the computer is enabled to perform the snapshot processing method described above.

This application further provides a computer program. When the computer program is executed by a computer, the computer is configured to perform the snapshot processing method according to any one of the foregoing embodiments.

This application further provides a chip, including a processor and a memory. The memory is configured to store a computer program, and the processor is configured to invoke and run the computer program stored in the memory, to perform the snapshot processing method according to any one of the foregoing embodiments.

Further, the chip may include a memory and a communication interface. The communication interface may be an input/output interface, a pin, an input/output circuit, or the like.

In an implementation process, the steps in the foregoing method embodiments may be implemented by using a hardware integrated logic circuit in the processor or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The general-purpose processor may be a microprocessor, or the processor may be any conventional processor or the like. The steps in the methods disclosed in embodiments of this application may be directly performed and completed by using a hardware encoding processor, or may be performed and completed by using a combination of hardware in the encoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the steps in the foregoing methods in combination with the hardware in the processor.

The memory mentioned in each of the foregoing embodiments may be a volatile memory or a non-volatile memory, or may include both a volatile memory and a non-volatile memory. The non-volatile memory may be a read-only memory (read-only memory. ROM), a programmable read-only memory (programmable ROM, PROM), an erasable programmable read-only memory (erasable PROM. EPROM), an electrically erasable programmable read-only memory (electrically EPROM, EEPROM), or a flash memory. The volatile memory may be a random access memory (random access memory, RAM), and is used as an external cache. As an example description rather than a limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the systems and methods described in this specification are intended to include but not limit to these memories and any memories of other proper types.

A person of ordinary skill in the art may be aware that, the units and the algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A skilled person may use different methods to implement the described functions for each particular application, but this implementation should not be considered as beyond the scope of this application.

It may be clearly understood by a person skilled in the art that, for convenient and brief description, for specific working processes of the system, apparatus, and unit described above, refer to corresponding processes in the foregoing method embodiments. Details are not described herein again.

In the several embodiments provided in this application, it should be understood that the disclosed system apparatus, and method may be implemented in other manners. For example, the apparatus embodiment described above is merely an example. For example, division into the units is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in an electrical form, a mechanical form, or another form.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the function is implemented in a form of a software functional unit and sold or used as an independent product, the function may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or some of the steps in the methods in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
- obtaining a first application switching instruction, wherein the first application switching instruction instructs to switch a target application from running in a background to running in a foreground;
- obtaining a first length-width ratio of a target display area based on the first application switching instruction, wherein the target display area is one of M display areas, where M is an integer;
- obtaining a target snapshot of the target application, wherein a second length-width ratio of the target snapshot corresponds to the first length-width ratio; and
- displaying the target snapshot in the target display area,
- wherein, before obtaining the first application switching instruction, the method further comprises:
  - obtaining a second application switching instruction instructing to switch the target application from running in the foreground to running in the background; and
  - obtaining an initial snapshot of the target application based on the second application switching instruction, wherein a third length-width ratio of the initial snapshot corresponds to a fourth length-width ratio of an initial display area, and wherein the initial display area is a display area in the M display areas that is in a working state when the target application enters the background for running.

2. The method of claim 1, wherein obtaining the target snapshot comprises:
- comparing the first length-width ratio with the fourth length-width ratio;
- selecting, when the first length-width ratio is the same as the fourth length-width ratio, the initial snapshot as the target snapshot; and
- changing, when the first length-width ratio is different from the fourth length-width ratio, a size of the initial snapshot based on the first length-width ratio to obtain the target snapshot.

3. The method of claim 1, wherein after obtaining the initial snapshot, the method further comprises separately changing a size of the initial snapshot based on (N−1) length-width ratios to obtain (N−1) candidate snapshots, wherein the (N−1) length-width ratios are (N−1) length-width ratios other than the third length-width ratio in N length-width ratios in the M display areas, and wherein N is an integer and M≥N≥2.

4. The method of claim 1, wherein after obtaining the initial snapshot, the method further comprises:
- separately changing an interface size or an element ratio of the target application based on (N−1) length-width ratios to obtain (N−1) interfaces, wherein the (N−1) length-width ratios are (N−1) length-width ratios other than the fourth length-width ratio in N length-width ratios in the M display areas, and wherein Nis an integer and M≥N≥2; and
- separately taking screenshots of the (N−1) interfaces to obtain (N−1) candidate snapshots.

5. The method of claim 1, wherein after obtaining the initial snapshot, the method further comprises:
- receiving a foldable screen state broadcast, wherein the foldable screen state broadcast indicates a latest foldable screen state;
- obtaining a fifth length-width ratio of an updated display area based on the latest foldable screen state; and
- changing a size of the initial snapshot based on the fifth length-width ratio to obtain a candidate snapshot.

6. The method of claim 3, wherein obtaining the target snapshot comprises selecting, from the (N−1) candidate snapshots, a candidate snapshot whose length-width ratio corresponds to the first length-width ratio as the target snapshot, wherein the candidate snapshot comprises the initial snapshot and the (N−1) candidate snapshots.

7. The method of claim 1, wherein obtaining the first application switching instruction comprises receiving a hot start operation to obtain the first application switching instruction.

8. An apparatus comprising:
- M display areas comprising N length-width ratios, where M≥N≥2;
- an input circuit or a receiver configured to obtain a first application switching instruction, wherein the first application switching instruction instructs to switch a target application from running in a background to running in a foreground;
- one or more processors coupled to the input circuit or the receiver and to the M display areas and configured to:
  - obtain a first length-width ratio of a target display area based on the first application switching instruction, wherein the M display areas comprise the target display area; and
  - obtain a target snapshot of the target application, wherein a second length-width ratio of the target snapshot corresponds to the first length-width ratio; and a display circuit coupled to the one or more processors and configured to display the target snapshot in the target display area, wherein, before obtaining the first application switching instruction, the one or more processors are further configured to:

obtain a second application switching instruction instructing to switch the target application from running in the foreground to running in the background; and obtain an initial snapshot of the target application based on the second application switching instruction, wherein a third length-width ratio of the initial snapshot corresponds to a fourth length-width ratio of an initial display area, and wherein the initial display area is a display area in the M display areas that is in a working state when the target application enters the background for running.

9. The apparatus of claim 8, wherein the one or more processors are further configured to:

compare the first length-width ratio with the fourth length-width ratio;

select, when the first length-width ratio is the same as the fourth length-width ratio, the initial snapshot as the target snapshot; and change, when the first length-width ratio is different from the fourth length-width ratio, a size of the initial snapshot based on the first length-width ratio to obtain the target snapshot.

10. The apparatus of claim 8, wherein the one or more processors are further configured to separately change a size of the initial snapshot based on (N−1) length-width ratios to obtain (N−1) candidate snapshots, wherein the (N−1) length-width ratios are (N−1) length-width ratios other than the fourth length-width ratio in N length-width ratios in the M display areas, and wherein N is an integer and M≥N≥2.

11. The apparatus of claim 10, wherein the one or more processors are further configured to select, from the (N−1) candidate snapshots, a candidate snapshot whose length-width ratio corresponds to the first length-width ratio as the target snapshot, wherein the candidate snapshot comprises the initial snapshot and the (N−1) candidate snapshots.

12. The apparatus of claim 8, wherein the one or more processors are further configured to:

separately change an interface size or an element ratio of the target application based on (N−1) length-width ratios to obtain (N−1) interfaces, wherein the (N−1) length-width ratios are (N−1) length-width ratios other than the fourth length-width ratio in N length-width ratios in the M display areas, and wherein Nis an integer and M≥N≥2; and separately take screenshots of the (N−1) interfaces to obtain (N−1) candidate snapshots.

13. The apparatus of claim 8, wherein the input circuit or the receiver is further configured to receive a foldable screen state broadcast, wherein the foldable screen state broadcast indicates a latest foldable screen state of the display, and wherein the one or more processors are further configured to:

obtain a fifth length-width ratio of an updated display area based on the latest foldable screen state; and change a size of the initial snapshot based on the fifth length-width ratio to obtain a candidate snapshot.

14. The apparatus of claim 8, wherein the input circuit or the receiver is further configured to obtain the first application switching instruction based on an operation performed in a multi-task interface.

15. A computer program comprising instructions that are stored on a non-transitory computer-readable storage medium and that, when executed by at least one processor, cause an electronic device to:

obtain a first application switching instruction, wherein the first application switching instruction instructs to switch a target application from running in a background to running in a foreground;

obtain a first length-width ratio of a target display area based on the first application switching instruction, wherein the target display area is one of M display areas, where M is an integer;

obtain a target snapshot of the target application, wherein a second length-width ratio of the target snapshot corresponds to the first length-width ratio; and display the target snapshot in the target display area, wherein, before obtaining the first application switching instruction, the instructions further cause the electronic device to:

obtain a second application switching instruction instructing to switch the target application from running in the foreground to running in the background; and obtain an initial snapshot of the target application based on the second application switching instruction, wherein a third length-width ratio of the initial snapshot corresponds to a fourth length-width ratio of an initial display area, and wherein the initial display area is a display area in the M display areas that is in a working state when the target application enters the background for running.

16. The computer program of claim 15, wherein the instructions further cause the electronic device to:

compare the first length-width ratio with the fourth length-width ratio;

select, when the first length-width ratio is the same as the fourth length-width ratio, the initial snapshot as the target snapshot; and change, when the first length-width ratio is different from the fourth length-width ratio, a size of the initial snapshot based on the first length-width ratio to obtain the target snapshot.

17. The computer program of claim 15, wherein the instructions further cause the electronic device to:

receive a foldable screen state broadcast, wherein the foldable screen state broadcast indicates a latest foldable screen state of the electronic device;

obtain a fifth length-width ratio of an updated display area based on the latest foldable screen state; and change a size of the initial snapshot based on the fifth length-width ratio to obtain a candidate snapshot.

18. The computer program of claim 15, wherein to obtain the first application switching instruction, the instructions further cause the electronic device to obtain the first application switching instruction based on an operation performed in a multi-task interface.

19. The computer program of claim 15, wherein to obtain the first application switching instruction, the instructions further cause the electronic device to receive a hot start operation to obtain the first application switching instruction.

20. The computer program of claim 15, wherein after obtaining the initial snapshot, the instructions further cause the electronic device to separately change a size of the initial snapshot based on (N−1) length-width ratios to obtain (N−1) candidate snapshots, wherein the (N−1) length-width ratios are (N−1) length-width ratios other than the third length-width ratio in N length-width ratios in the M display areas, and wherein N is an integer and $M \geq N \geq 2$.

* * * * *